United States Patent
Sohn

(10) Patent No.: US 7,761,103 B2
(45) Date of Patent: Jul. 20, 2010

(54) SYSTEM AND METHOD FOR ZONE-BASED PERSONALIZED INFORMATION PROVIDING

(75) Inventor: Sung-Chul Sohn, 1206, E-Dong, Misung-Apartment, Youido-Dong, Yongdeungpo-Ku, Seoul (KR)

(73) Assignees: Sung-Chul Sohn, Seoul (KR); SK Telecom Co., Ltd., Seoul (KR)

( * ) Notice: Subject to any disclaimer, the term of this patent is extended or adjusted under 35 U.S.C. 154(b) by 1235 days.

(21) Appl. No.: 10/563,287

(22) PCT Filed: Jul. 2, 2004

(86) PCT No.: PCT/KR2004/001638

§ 371 (c)(1),
(2), (4) Date: Jan. 3, 2006

(87) PCT Pub. No.: WO2005/004509

PCT Pub. Date: Jan. 13, 2005

(65) Prior Publication Data

US 2006/0205419 A1    Sep. 14, 2006

(30) Foreign Application Priority Data

Jul. 3, 2003  (KR)  .................. 10-2003-0044749
Feb. 13, 2004  (KR)  .................. 10-2004-0009615

(51) Int. Cl.
*H04W 24/00* (2009.01)
*H04W 4/00* (2009.01)
*H04M 11/04* (2006.01)

(52) U.S. Cl. .................... 455/456.3; 455/466

(58) Field of Classification Search ............. 455/404.2, 455/414.2–414.4, 422.1, 456.1–457; 370/310, 370/338
See application file for complete search history.

(56) References Cited

U.S. PATENT DOCUMENTS 6,035,193 A    3/2000    Buhrmann et al.
(Continued)

FOREIGN PATENT DOCUMENTS

CN    1233378    10/1999
(Continued)

*Primary Examiner*—Patrick N Edouard
*Assistant Examiner*—Michael T Thier
(74) *Attorney, Agent, or Firm*—Lowe Hauptman Ham & Berner LLP

(57) ABSTRACT

A system and method for providing zone-based personalized information to a user of mobile communication terminal located in a specific zone are presented. The system comprises a zone management system which acquires MIN information of a mobile communication terminal entering a specific zone, a zone information management server which receives the MIN information and zone identification information, requests location registration of the terminal to HLR and retrieves transmission information to be transferred to the terminal, and a SMS server which receives the transmission information and the MIN information from the zone information management server, gets location information of the terminal corresponding to the MIN information from the HLR, and transfers the transmission information and the MIN information to base station of the cell where the terminal is located. According to the system, distinct information according to the present location of the user can be provided for the user.

13 Claims, 31 Drawing Sheets

U.S. PATENT DOCUMENTS

| | | | |
|---|---|---|---|
| 6,052,591 A * | 4/2000 | Bhatia .................. 455/445 |
| 6,381,457 B1 | 4/2002 | Carlsson et al. |
| 6,678,394 B1 * | 1/2004 | Nichani .................. 382/103 |
| 6,993,326 B2 * | 1/2006 | Link et al. ............... 455/414.1 |
| 2004/0092271 A1 * | 5/2004 | Viikari et al. ............ 455/456.2 |
| 2004/0203857 A1 * | 10/2004 | Wang ..................... 455/456.1 |

FOREIGN PATENT DOCUMENTS

| | | |
|---|---|---|
| KR | 10-2000-0044252 A | 7/2000 |
| KR | 10-2002-0006357 A | 1/2002 |
| KR | 10-2002-0044404 A | 6/2002 |
| WO | 98/08350 | 2/1998 |

* cited by examiner

SYSTEM AND METHOD FOR ZONE-BASED PERSONALIZED INFORMATION PROVIDING

RELATED APPLICATION

This application is a national phase of PCT/KR2004/001638 filed on Jul. 2, 2004, which claims priority from Korean Application No. 10-2003-0044749 filed on Jul. 3, 2003 and Korean Application No. 10-2004-0009615 filed on Feb. 13, 2004, the disclosures of which Applications are incorporated by reference herein. The benefit of the filing and priority dates of the International and Korean Applications is respectfully requested.

TECHNICAL FIELD

The present invention relates to a zone-based personalized information providing system and method, and in particular to a zone-based personalized information providing system for providing a mobile communication user located in a specified zone with distinct information.

BACKGROUND ART

As mobile communication technology has progressed rapidly, mobile communication terminal has not only become a voice communication device, but also a media that provides mobile communication user with a variety of information.

Accordingly, the mobile communication network in the prior art provides a mobile communication user with a variety of information by using SMS (Short Message Services), and the procedures will be followed.

The first of all, the SMS server/CBC (Cell Broadcasting Center), which receives the information that is to provide a mobile communication user from information providers who provides a variety of information, transforms the received information to SMS messages and transmits them to SMC (SMS Message Center). SMC that received SMS messages acquires location information of the mobile terminal, which is to received SMS messages, from the HLR (Home Location Register), and transmits SMS messages to mobile switching system which corresponds to the location.

SMS messages which are transmitted to mobile switching system are transferred to a base station via a base station controller, and are transmitted to mobile terminal through a paging channel or traffic channel in the base station.

Meanwhile, the location information of a mobile terminal is managed as cell-based.

As described as above, a variety of information is provided to a mobile user by using SMS messages in the prior mobile communication network. However, as the mobile communication user is registered as cell-based location, it is impossible to provide a mobile user with zone-based specified information, but only possible to provide extensive contents.

DISCLOSURE OF INVENTION

The invention is presented to solve the problem said above. Thus, the object of the present invention is to provide a system and method for providing zone-based personalized information to a user of mobile communication terminal located in a specific zone by acquiring MIN information of a mobile communication terminal entering a specific zone, transmitting then the MIN information and transmission information to a SMS server, and transferring the transmission information to the terminal.

To achieve the object, a zone-based personalized information system according to an embodiment of the present invention comprises: a zone management system which is installed in a specific zone, and acquires MIN information of a mobile communication terminal entering the specific zone; a zone information management server which receives, from the zone management system, the MIN information and zone identification information of the zone where the zone management system is installed, requests location registration of the terminal to HLR and retrieves transmission information to be transferred to the terminal according to the MIN information and the zone identification information, and a SMS server which receives the transmission information and the MIN information from the zone information management server, gets location information of the terminal corresponding to the MIN information from the HLR, and transfers the transmission information and the MIN information to base station of the cell where the terminal is located according to the location information. According to the system, distinct information according to the present location of the user can be provided for the user.

Preferably, the zone management system receives mobile terminal information that is transferred from a mobile terminal to a base station, and acquires MIN information from the received mobile terminal information.

And the zone management system preferably comprises: an antenna which receives high frequency signal including mobile terminal information that is transmitted from mobile terminal to base station; a high frequency signal processing part which converts the high frequency signals transmitted from the antenna to the intermediate frequency signals; a base-band processing part which after converting the intermediate frequency signal received from the high frequency processing part to digital signals, and demodulating, acquires MIN information from the demodulated data; and a communication part which, under control of a control part, transmits the MIN information and the zone identification information to the zone information management server.

Furthermore, it is preferable that the zone management system comprises the fire detecting part which detects outbreak of fire by sensing heat or smoke.

The high frequency signal processing part preferably comprises;

a diplexer that splits the received signals from the antenna into high frequency signal of 800 MHz band and high frequency signal of 1.8 GHz band, a low noise amplifier that amplifies each high frequency signal inputted from the diplexer, a band pass filter that selects a needed frequency band from the high frequency signals inputted from the low noise amplifier and passes only the selected band, a downward frequency mixer that converts high frequency signals to intermediate frequency signals by mixing the high frequency signals inputted from the band pass filter and a local signal inputted from the PLL, an intermediate frequency amplifier that amplifies the intermediate frequency signals inputted from the downward frequency mixer, an intermediate frequency signal processing part that gain-controls each intermediate frequency signal from the intermediate frequency amplifier to a desired level.

The zone management system preferably transmits a MAC address and zone identification information to the zone information management server after receiving mobile terminal information transmitted from the mobile terminal to a base station, and retrieving the MAC address from the received mobile terminal information.

Furthermore, the zone information management server preferably searches a MIN information database by use of the MAC address that is transmitted from the zone management system, and searches the MIN information matched to the MAC address, and requests the location registration of the mobile terminal to the HLR by use of the MIN information and the zone identification information, and searches transmission information to be transmitted to the mobile terminal by use of the MIN information and the zone identification information, and transmits the transmission information and the MIN information to the SMS server.

The zone management system periodically transmits a specified zone notifying frequency signal to its own zone, receives Bluetooth signals that mobile terminal transmits when it detects the specified zone notifying frequency signal, and acquires the MIN information from the Bluetooth signals.

The mobile terminal preferably comprises a specified zone detecting part that detects the entry into a specified zone by receiving the specified zone notifying frequency signal; a Bluetooth signal processing part that, by being converted to active mode under control of the specified zone detecting part, transmits the MIN information to the zone management system through a Bluetooth signal.

The zone management system preferably comprises antennas which receives Bluetooth signal, a specified zone notifying frequency processing part that periodically transmits a specified zone notifying frequency signal, a received Bluetooth signal processing part that acquires the MIN information by processing the Bluetooth signal received through the antenna, a control part that, after the MIN information is acquired in the received Bluetooth signal part, transmits the MIN information and the zone identification information to the zone information management server by controlling the communication part.

Meanwhile, the specified zone management system periodically transmits a specified zone notifying frequency signal to its own zone, receives microwave of 2.4 GHz band, which is designated for WLAN, that is transmitted by a mobile terminal detecting the specified zone notifying frequency signal, and acquires the MIN information from the received microwave.

Furthermore, the mobile terminal preferably comprises a specified zone detecting part that detects the entry into a specified zone by receiving the specified zone notifying frequency signal, and a microwave processing part that, by being converted to active mode under control of the specified zone detecting part, transmits the MIN information to the zone management system through the microwave signal.

The zone management system preferably comprises an antennas that receives microwaves, a specified zone notifying frequency processing part that periodically transmits a specified zone notifying frequency signal through the antenna, a received microwave signal processing part that acquire the MIN information by processing the microwave signal received through the antenna, a control part that, after the MIN information is acquired in the received microwave signal part, transmits the MIN information and the zone identification information to the zone information management server by controlling the communication part.

Meanwhile, the zone management system periodically transmits a specified zone notifying frequency signal to its own zone, receives BCDMA signal that is transmitted by the mobile terminal detecting the specified zone notifying frequency signal, and acquires the MIN information from the received BCDMA signal.

Furthermore, the mobile terminal preferably comprises a specified zone detecting part that detects the entry into a specified zone by receiving the specified zone notifying frequency signal, a microwave processing part that, by being converted to active mode under control of the specified zone detecting part, transmits the MIN information to the zone management system through the BCDMA signal.

The zone management system comprises antennas, which receives BCDMA signals, a specified zone notifying frequency processing part that periodically transmits a specified zone notifying frequency signal through the antenna, a received BCDMA signal processing part that acquires the MIN information by processing the BCDMA signal received through the antenna, a control part that, after the MIN information is acquired in the received BCDMA signal processing part, transmits the MIN information and the zone identification information to the zone information management server by controlling the communication part.

Meanwhile, the specified zone management system periodically transmits a specified zone notifying frequency signal to its own zone, receives microwaves of 2.4 GHz band/915 MHz band/868 MHz band, which is designated for ZigBee, that is transmitted by a mobile terminal detecting the specified zone notifying frequency signal, and acquires the MIN information from the received microwave.

Furthermore, the mobile terminal preferably comprises a specified zone detecting part that detects the entry into a specified zone by receiving the specified zone notifying frequency signal, and a microwave processing part that, by being converted to active mode under control of the specified zone detecting part, transmits the MIN information to the zone management system through the microwave signal.

The zone management system preferably comprises antennas, which receives microwaves, a specified zone notifying frequency processing part that periodically transmits a specified zone notifying frequency signal through the antenna, a received microwave signal processing part that acquires the MIN information by processing the microwave signal received through the antenna, a control part that, after the MIN information is acquired in the received microwave signal part, transmits the MIN information and the zone identification information to the zone information management server by controlling the communication part.

Meanwhile, the zone management system periodically transmits a specified zone notifying frequency signal to its own dedicated zone, receives a radio signal that is transmitted by the mobile terminal detecting the specified zone notifying frequency signal, and acquires the MIN information from the received radio signal.

Furthermore, the mobile terminal preferably comprises a specified zone detecting part that detects the entry into a specified zone by receiving the specified zone notifying frequency signal, and a radio wave processing part that, by being converted to active mode under control of the zone management system, transmits the MIN information to the specified zone notifying frequency processing part through the radio wave.

The zone management system comprises antennas, which receives radio waves, a specified zone notifying frequency processing part that periodically transmits a specified zone notifying frequency signal, a received radio wave signal processing part that acquires the MIN information by processing the radio waves received through antennas, a control part that, after the MIN information is acquired in the received radio wave processing part, transmits the MIN information and the zone identification information to the zone information management server by controlling the communication part.

Meanwhile the specified zone-base personalized information providing method according to one embodiment of the invention comprises steps of: acquiring MIN information of a mobile communication terminal entering a specific zone, in a zone management system; requesting location registration of the terminal to HLR in a zone information management server using the MIN information and a zone identification information from the zone management system; retrieving transmission information to be transferred to the terminal according to the zone identification information and the MIN information, in the zone information management server; transferring the transmission information and the MIN information to a SMC via the SMS server; generating the SMS message by use of the transmission information, and getting location information of the mobile terminal corresponding to the MIN information from the HLR, in the SMC; transferring the SMS message and the MIN information to base station of the cell where the terminal is located according to the location information; and transforming the SMS message and the MIN information into the data burst message format, and transmitting them to the terminal, in the base station.

Furthermore, the method further comprises steps of: when the zone management system detects an outbreak of fire, notifying the zone management server of it; transferring MIN information list of the mobile communication terminals, which are located in the zone of the zone management system, and the announcement of the outbreak of fire to the SMC via the SMS server; generating the SMS message by use of the announcement of the fire in the SMC and getting location information of the mobile terminal corresponding to the MIN information from the HLR; transferring the SNS message and the MIN information list to base station of the cell where the terminal is located according the location information; and transforming the SMS message and the MIN information into the data burst message format, and transmits them to the terminal.

And, it is preferable to further comprise transferring the MIN information list of the mobile terminal, which are located in the zone of the other zone management system which is located in the same building where the zone management system notifying the fire alarm is also located, and the announcement of the outbreak of fire to the SMS server.

Furthermore, the step of acquiring the MIN information may comprise receiving mobile terminal information which is transmitted by the mobile terminal entering the specific zone under the control of the zone management system, and acquiring the MIN information from the received terminal information.

And, the step of acquiring the MIN information may comprise periodically transmitting the specific zone notifying frequency signal to the corresponding zone, receiving the Bluetooth signal from the mobile terminal which detects the specific zone notifying frequency signal, and acquiring the MIN information from the Bluetooth signal.

The step of acquiring the MIN information may comprise periodically transmitting the specific zone notifying frequency signal to the corresponding zone, receiving the microwave of 2.4 GHz band, which is assigned for WLAN, from the mobile terminal which detects the specific zone notifying frequency signal, and a step which acquires the MIN information from the microwave.

And, the step of acquiring the MIN information may comprise periodically transmitting the specific zone notifying frequency signal to the corresponding zone, receiving the BCDMA signal from the mobile terminal which detects the specific zone notifying frequency signal, and acquiring the MIN information from the BCDMA signal.

The step of acquiring MIN information may comprise periodically transmitting the specific zone notifying frequency signal to the corresponding zone, receiving the microwave of 2.4 GHz band/915 MHz band/868 MHz band, which is assigned for ZigBee, from the mobile terminal which detects the specific zone notifying frequency signal, and acquiring the MIN information from the microwave.

And, the step of acquiring the MIN information may comprise periodically transmitting the specific zone notifying frequency signal to the corresponding zone, receiving the radio wave from the mobile terminal which detects the specific zone notifying frequency signal, and acquiring the MIN information from the radio wave.

Figure 1:
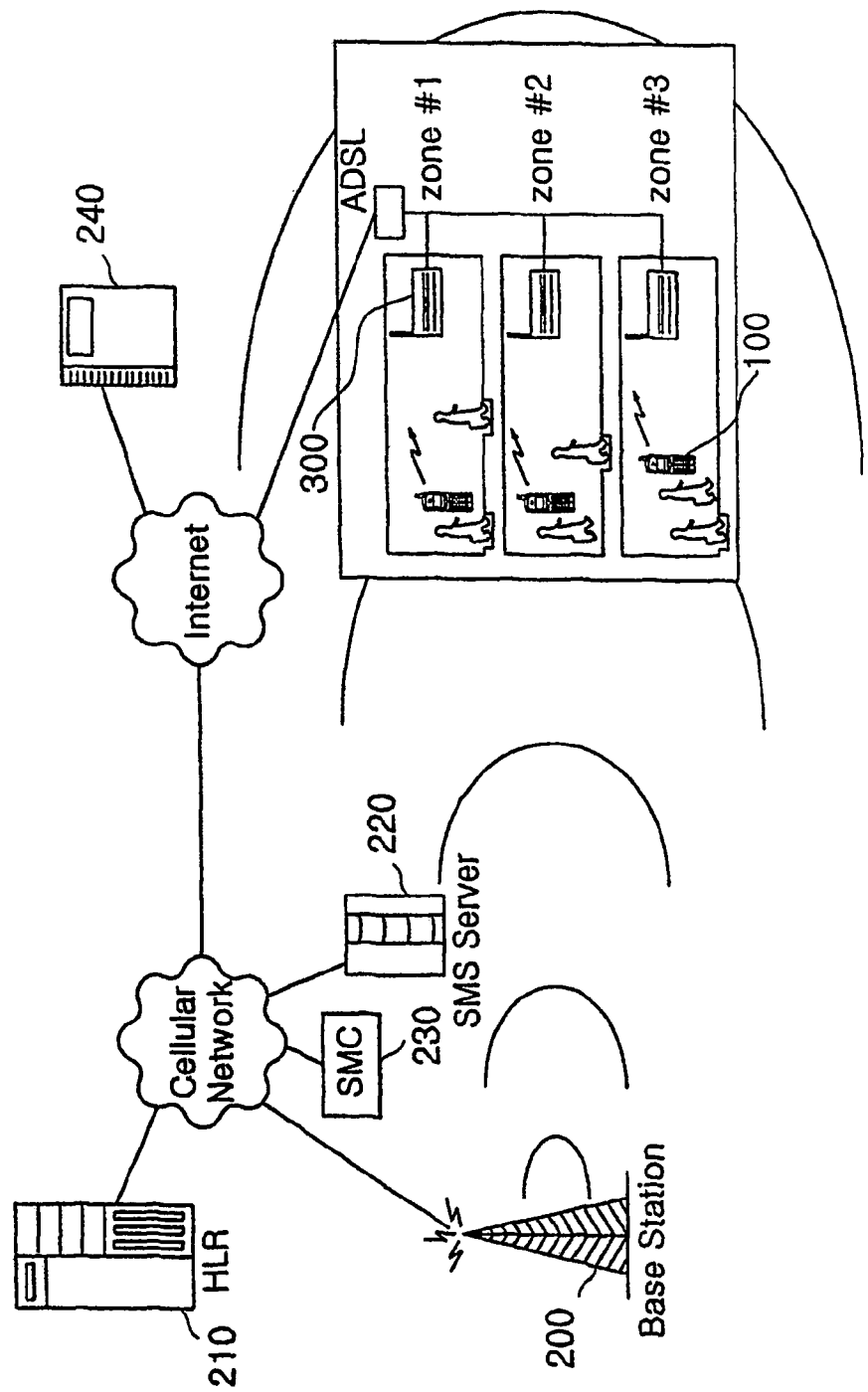
FIG. 1 illustrates a zone-based personalized information providing system according to one embodiment of the invention.

EXPLANATION FOR NOTATIONS OF MAJOR PARTS IN THE DRAWINGS 110, 120, 130, 140, 150, 160: mobile communication terminal,
121, 131, 141, 151, 161: key-input part,
122, 132, 142, 152, 162: radio processing part,
123, 133, 143, 153, 163: transceiver part,
124, 134, 144, 154, 164: display part,
125, 135, 145, 155, 165: memory part,
126, 136, 146, 156, 166: specified zone detecting part,
127: bluetooth signal processing part, 137: microwave processing part,
147: BCDMA signal processing part, 157: microwave processing part
167: radio wave processing part, 128, 138, 148, 158, 168: Control parts,
129, 139, 149, 159, 169: Power source, 200: base station,
210: HLR, 220: SMS server,
240: zone information management server,
300, 400, 500, 600, 700, 800: zone management system,
310, 410, 510, 610, 710, 810: antenna,
320: high frequency (HF) processing part, 321: diplexer,
322-a/322-b: Low noise amplifiers, 323-a/323-b: Band Pass Filter (BPF)
324-a/324-b: Down-frequency mixers,
325-a/325-b: Phase Locked Loop (PLL),
326-a/326-b: intermediate-frequency amplifiers,
327-a/327-b: intermediate-frequency (IF) signal processors,
330: Base band processing part,
340, 440, 540, 640, 740, 840: Communication part,
350, 450, 550, 650, 750, 850: Control part,
360, 460, 560, 660, 760, 860: Power source,
370, 470, 570, 670, 770, 870: Fire detecting part,
420, 520, 620, 720, 820: specified zone notifying frequency processing part,
430: Received bluetooth signal processing part,
530: Received microwave processing part,
630: Received BCDMA signal processing part,
730: Received microwave processing part,
830: Received radio wave processing part.

BEST MODE FOR CARRYING OUT THE INVENTION

The specified zone-base personalized information providing system and method according to a preferred embodiment of the invention will be described in detail by reference of attached drawings.

FIG. 1 illustrates a specified zone-base personalized information providing system according to one embodiment of the invention, which comprises the mobile communication terminal (MCT) (110), the Base Station Transceiver System (BTS) (200), HLR (Home Location Register) (210), SMS server (220), SMC (SMS Message Center) (230), the Zone Management System (ZMS) (300), and the Zone Information Management Server (ZIMS) (240).

In this constitution, the mobile terminal (110) is a mobile terminal, which is implemented by cell phone or PCS, or etc, which is subscribed in mobile communication services provided by mobile communication service provider (for example, SK telecom, KTF, LG telecom), and which provides mobile communication users with character messages received from the BTS.

The BTS (200) allocated in a cell communicates with the MCT and provides mobile communication users with the mobile communication services.

The HLR (210), which stores and manages the subscriber parameters and the current location information of all the MCT (110) registered in its own area, performs the location registration according to the MIN information, which is transferred from the ZIMS (240) accompanied with the location registration request, and the Zone Identification Information (ZII).

The SMS server (220) transfers the transmission information transmitted from the ZIMS (240) and the MIN information to the SMC (230).

The SMC (230) generates the SMS messages by use of the transmission information transferred from the SMS server (220), gets the location information of the MCT from the HLR (210) according to the MIN information transferred from the SMS server (220), and, by use of the location information, transmits the SMS message to the BTS, where the MCT is located, via the MSC (Mobile Switching Center) (not illustrated).

The ZMS (300) located in a specified zone acquires the MIN information from the terminal information which is periodically transmitted from the MCT (110) entering the zone to the BTS (200), and can provide the MCT (110) with the information to be provided for the mobile communication user by transmitting the acquired MIN information and ZII to the ZIMS (240).

In addition, the ZMS (300) located in a specified zone acquires the MAC (Media Access Control) address instead of the MIN information from the terminal information which is periodically transmitted from the MCT (110) entering the zone to the BTS (200), and also can provide the MCT (110) with the information to be provided for the mobile communication user by transmitting the acquired MAC address and ZII to the ZIMS (240).

The ZMS (300) is installed in the places such as department stores, the subway, discount stores, the express bus toll-gate, the park, fast-food stores, where many anonymous people gather, and as the radius of the service area that a ZMS covers is less than about 2 to 50 m, it is possible for a plurality of ZMSs to manage a specified place in detail by splitting the specified place into several zones.

The ZIMS (240), when it receives the MIN information and the zone identification information from the ZMS (300), requests the location registration of the mobile terminal for the HLR (210) by use of the MIN information and the zone identification information, searches for the information to be transferred to the corresponding user by means of the MIN information transferred from the ZMS (300), after searching for the transmission information to be provided to the corresponding zone by means of the zone identification information transferred along with the MIN information, transfers the searched transmission information and the MIN information to the corresponding SMS server (220).

The ZIMS (240), when it receives the MAC address instead of the MIN information and the zone identification information from the ZMS (300), acquires the MIN information matched to the MAC address by searching the MIN information data base by use of the received MAC address, requests the location registration of the mobile terminal for the HLR (210) by use of the MIN information and the zone identification information, searches for the information to be transferred to the corresponding user by use of the MIN information searched from the MIN information database, and after searching for the transmission information to be provided to the corresponding zone by means of the zone identification information transferred from the ZMS (300), transfers the searched transmission information and the MIN information to the corresponding SMS server (220).

The MAC address and the MIN information has matched with each other in the MIN information database.

As previously said, when the ZIMS (240) requests the location registration for the HLR (210), it requests the location registration for the HLR (210) of the mobile communication provider, where the corresponding mobile terminal is subscribed, according to the MIN information searched from the MIN information database by use of either the MIN information or the MAC address transferred from the ZMS (300). For example, after the transferred MIN information or the searched MIN information is verified, if the mobile terminal is subscribed in the service for which SK telecom provides, the corresponding MIN information and the location information are transferred to SK telecom's network.

The ZIMS (240) also manages the MIN information of the mobile terminal located in a specified zone according to each ZMS.

Figure 2:
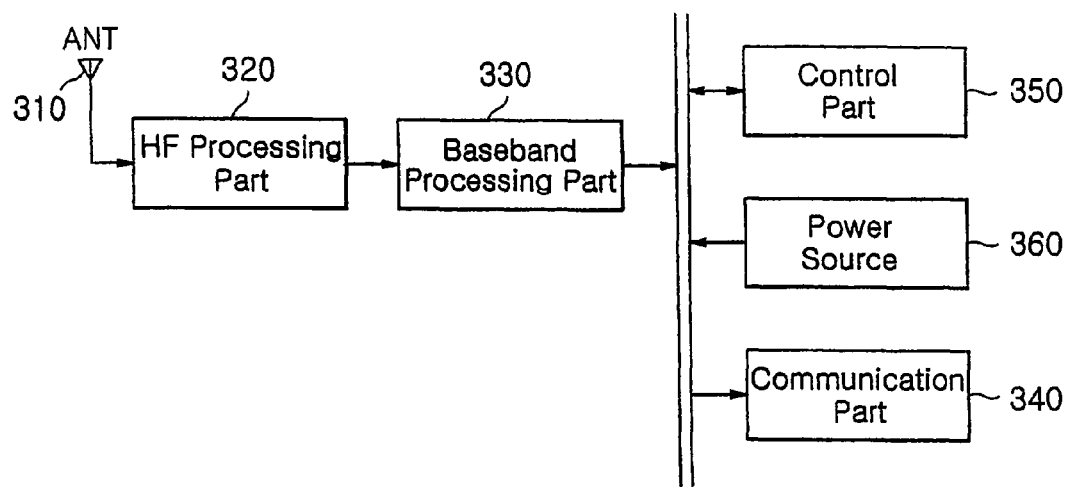
FIG. 2 illustrates the constitution of a zone management system according to one embodiment in FIG. 1.

FIG. 2 illustrates the constitution of the ZMS (300) according to one embodiment in FIG. 1, which comprises an antenna (310), a high frequency (HF) processing part (320), a baseband processing part (330), a communication part (340), a control part (350), and a power source (360).

The antenna (310) receives the mobile terminal information transmitted from a mobile terminal entering a specific zone, and can receives the radio signal band of 800 MHz and 1.8 GHz. It can be possible to use just one antenna to receive both 800 MHz band used for the Cellular CDMA communication and 1.8 GHz band used for the PCS (Personal Communication Service) CDMA communication, or to use more than one antenna to separately receive the radio signal of 800 MHz band and 1.8 GHz band.

The HF processing part (320), which transforms the high frequency signal received from the antenna (310) into the intermediate frequency signal and transfers the transformed intermediate frequency signal to the baseband processing part (330), transforms the different high frequency signals received from the antenna, for example, 800 MHz band for the Cellular CDMA communication and 1.8 GHz band for the PCS (Personal Communication Service) CDMA communication, into each intermediate frequency signal.

After the baseband processing part (330) transforms the intermediate frequency signal inputted from the HF processing part (320) into the digital signal and demodulates, it acquires the MIN information/or MAC address from the demodulated data.

Under control of the control part (350), the communication part (340) transmits the MIN information/the MAC address acquired from the baseband processing art (330) and the zone identification information to the ZIMS (240).

Figure 3:
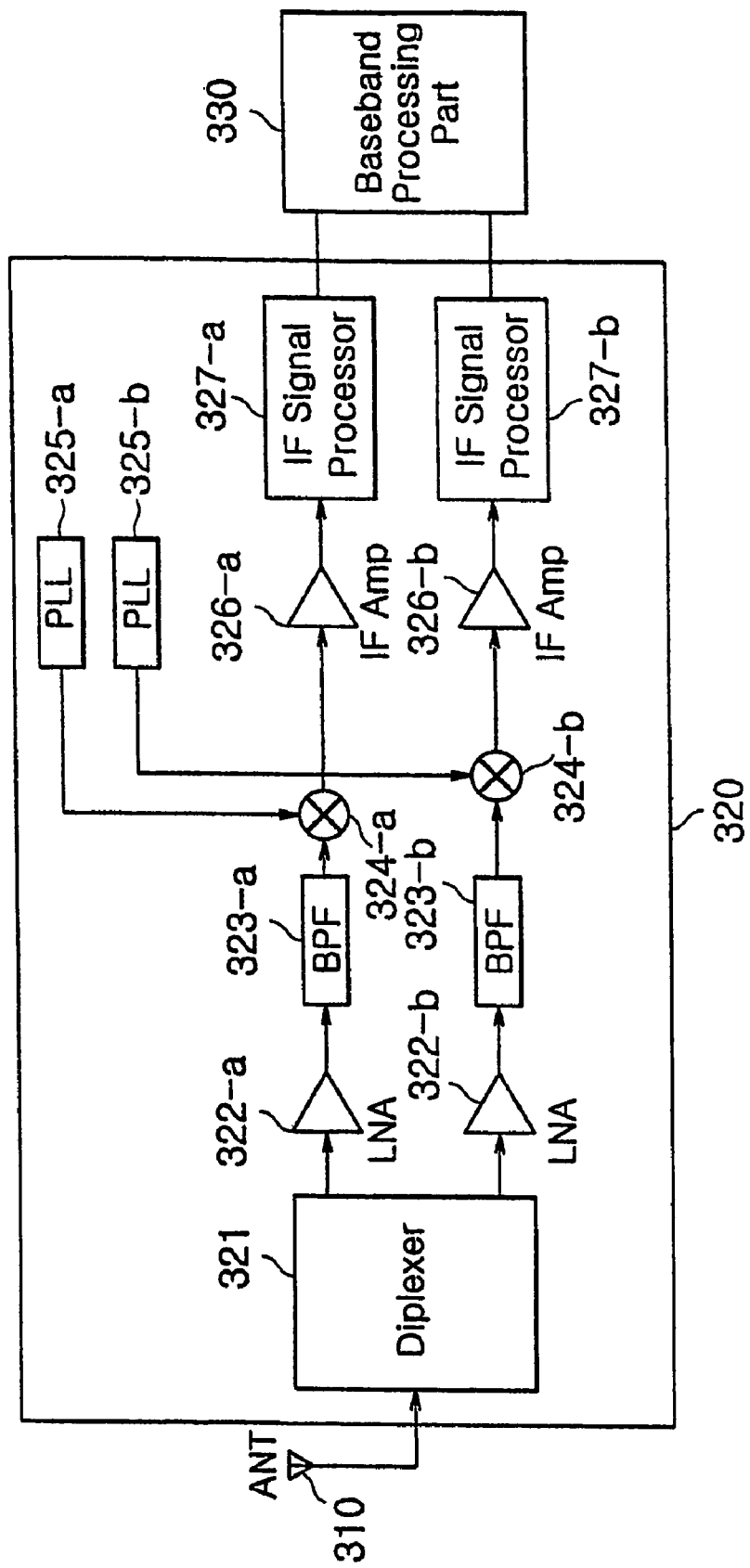
FIG. 3 illustrates an example of the constitution of high frequency radio processing part in FIG. 2.

FIG. 3 exemplarily illustrates the constitution of the HF processing part according to one embodiment in FIG. 2, which comprises the Diplexer (321), the LNA (Low Noise Amplifier) (322-a/322-b), the BPF (Band Pass Filter) (323-a/323-b), the Down-Frequency Mixer (324-a/324-b), the PLL (Phase Locked Loop) (325-a/325-b), the Intermediate Frequency Amplifier (326-a/326-b), and the Intermediate Frequency signal processing part (327-a/327-b).

The Diplexer (321) splits the signals received from antennas into the high-frequency signal of 800 MHz band and the high frequency signal of 1.8 GHz band, and inputs these to the LNA (322-a/322-b).

The LNA (322-a/322-b) amplify each high frequency signal inputted from the Diplexer, and inputs it to the BPF (323-a/323-b).

By selecting a needed frequency band from the signals inputted from the low noise amplifier (3220a/322-b), the BPF (323-a/323-b) passes the needed frequency at low insertion loss and deletes the extra unnecessary frequency.

The Down-Frequency Mixer (324-a/324-b) converts the high frequency signals inputted from BPF (323-a/323-b) to the intermediate frequency signals by mixing the HF signals and the local signal inputted from the PLL (325-a/325-b).

The PLL (325-a/325-b) provides the Down-Frequency Mixer with the local signal necessary for transforming the intermediate frequency signal.

The intermediate frequency amplifier (326-a/326-b) amplifies the intermediate frequency signals inputted from the downward frequency mixer, and inputs it to the intermediate frequency signal processing part (327-a/327-b).

The intermediate frequency signal processing part (327-a/327-b) controls gains in each intermediate frequency signal from the intermediate frequency amplifier to a desired level, and input it the Baseband Processing part (330).

Figure 4:
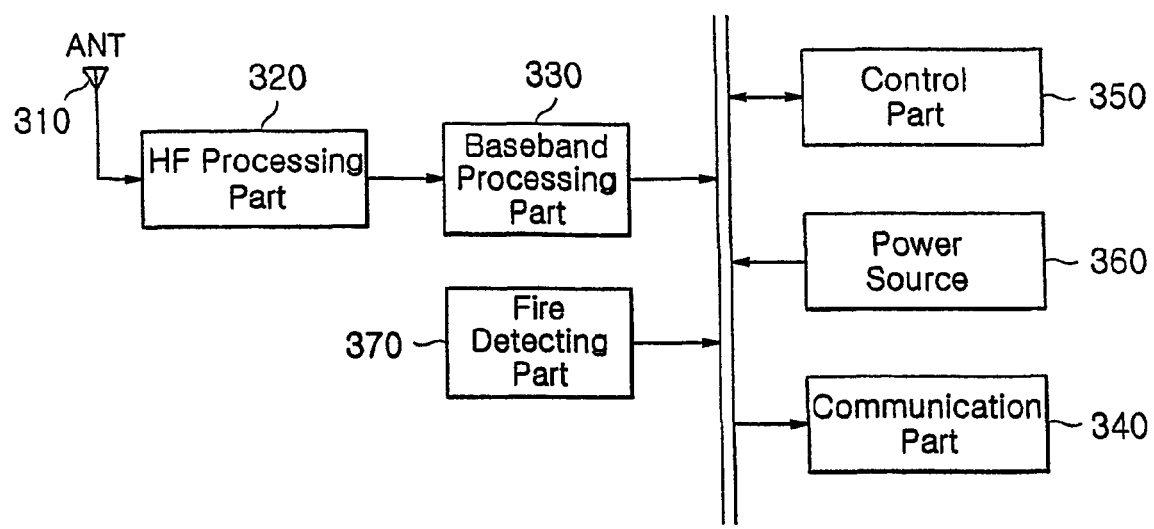
FIG. 4 illustrates the constitution of a zone management system according to another embodiment in FIG. 1.

FIG. 4 depicts the constitution of the zone management system according to another embodiment, which comprises Antenna (310), the HF processing part (320), the Baseband Processing part (330), the Fire Detecting part (370), the Communication part (350), and the Power Source (360).

As the Antenna (310), the HF processing part (320), the Baseband Processing part (330), the Communication part (340), the Control part (350), and the Power Source (360) has the similar constitution and function to those of the ZMS according to the one embodiment, the description of them is to be skipped.

But, the Fire Detecting part (370), which comprises the heat detecting sensor and the smoke detecting sensor installed at appropriate locations, detects outbreaks of fire, and notifies the Control part of that accident when it senses an outbreak of fire.

The Control part (350) notifies the ZIMS (240) of the outbreak of fire by use of the signal inputted from the Fire Detecting part (370).

Figure 5:
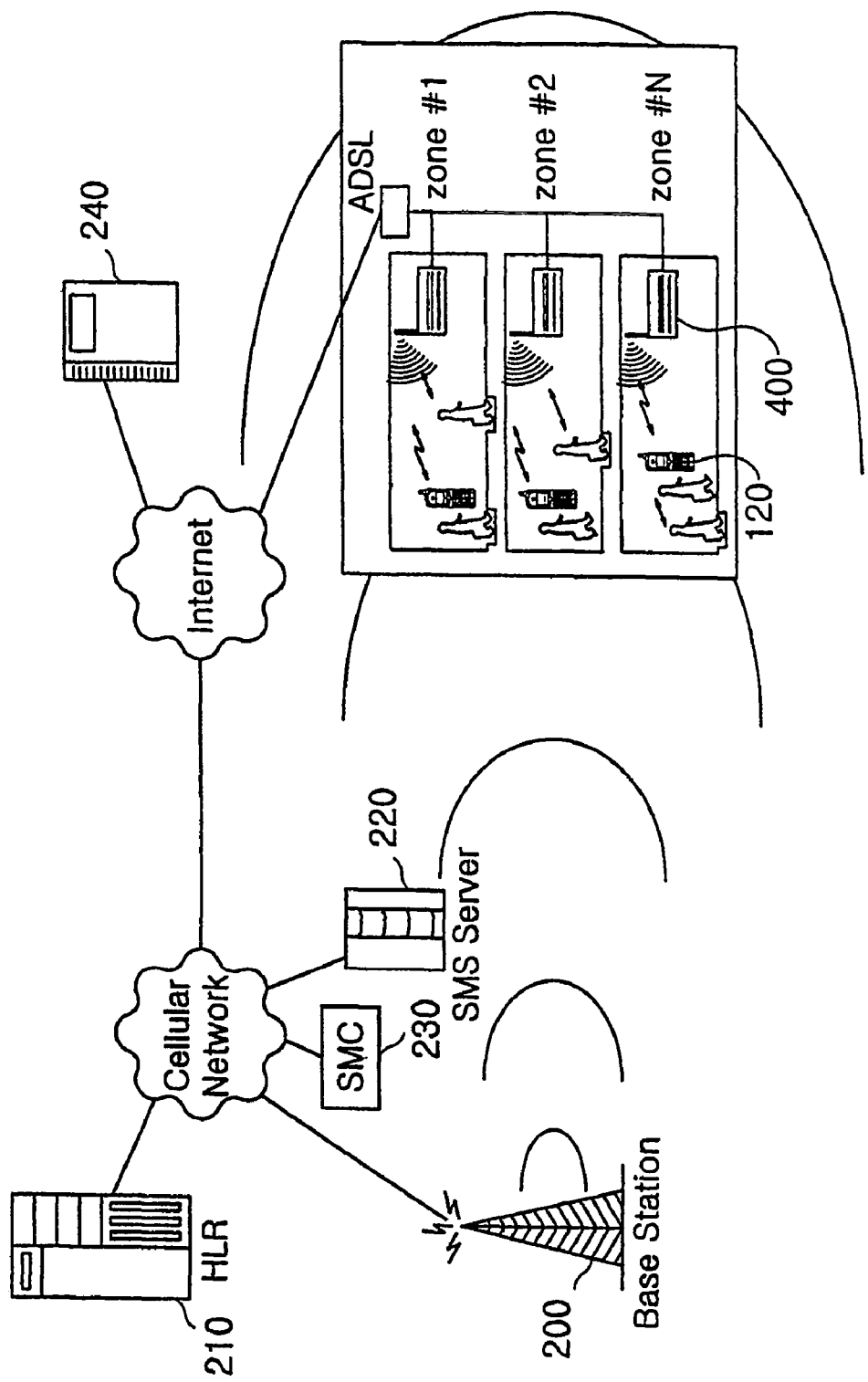
FIG. 5 illustrates a zone-based personalized information providing system according to another embodiment of the invention.

FIG. 5 illustrates the constitution of the specified zone-based personalized information providing system according to another embodiment of the invention, which comprises the mobile communication terminal (MCT) (120), the Base Station Transceiver System (BTS) (200), HLR (Home Location Register) (210), SMS server (220), SMC (SMS Message Center) (230), the Zone Management System (ZMS) (400), and the Zone Information Management Server (ZIMS) (240).

As the constitution and the function of the Base Station Transceiver System (BTS) (200), HLR (Home Location Register) (210), SMS server (220), SMC (SMS Message Center) (230), the Zone Information Management Server (ZIMS) (240) are similar to those of the one embodiment of the invention, the description of them is skipped.

But, the Mobile Terminal (120) converts the Bluetooth chip to active mode by verifying the entry into a specified zone according to reception of the specified zone notifying frequency signal that the ZMS periodically transmits, and transmits the MIN information or the MAC address to the ZMS (400) through the Bluetooth signal.

The Zone Management System (ZMS) (400), which is located in a specified area, signifies that the area is the specified zone by periodically transmitting the specified zone notifying frequency signal, acquires the MIN information/the MAC address by receiving the Bluetooth signal that the Mobile Terminal (120), which detects the entry into the specified zone according to reception of the specified zone notifying frequency signal, transmits, and provides information to be provided for the Mobile Terminal by transmitting the acquired MIN information/MAC address and the zone identification information to the ZMS (240).

The frequency signal of 900 MHz band among the ISM (Industrial Scientific Medical) Band can be used for the specified zone notifying frequency signal.

In addition, the ZMS (400) generates the location registration requesting message for the Mobile Terminal that can not verify the entry into a specified zone according to reception of the specified zone notifying frequency signal, and then transmits the generated location registration requesting message to the specified zone through Bluetooth signal.

Figure 6:
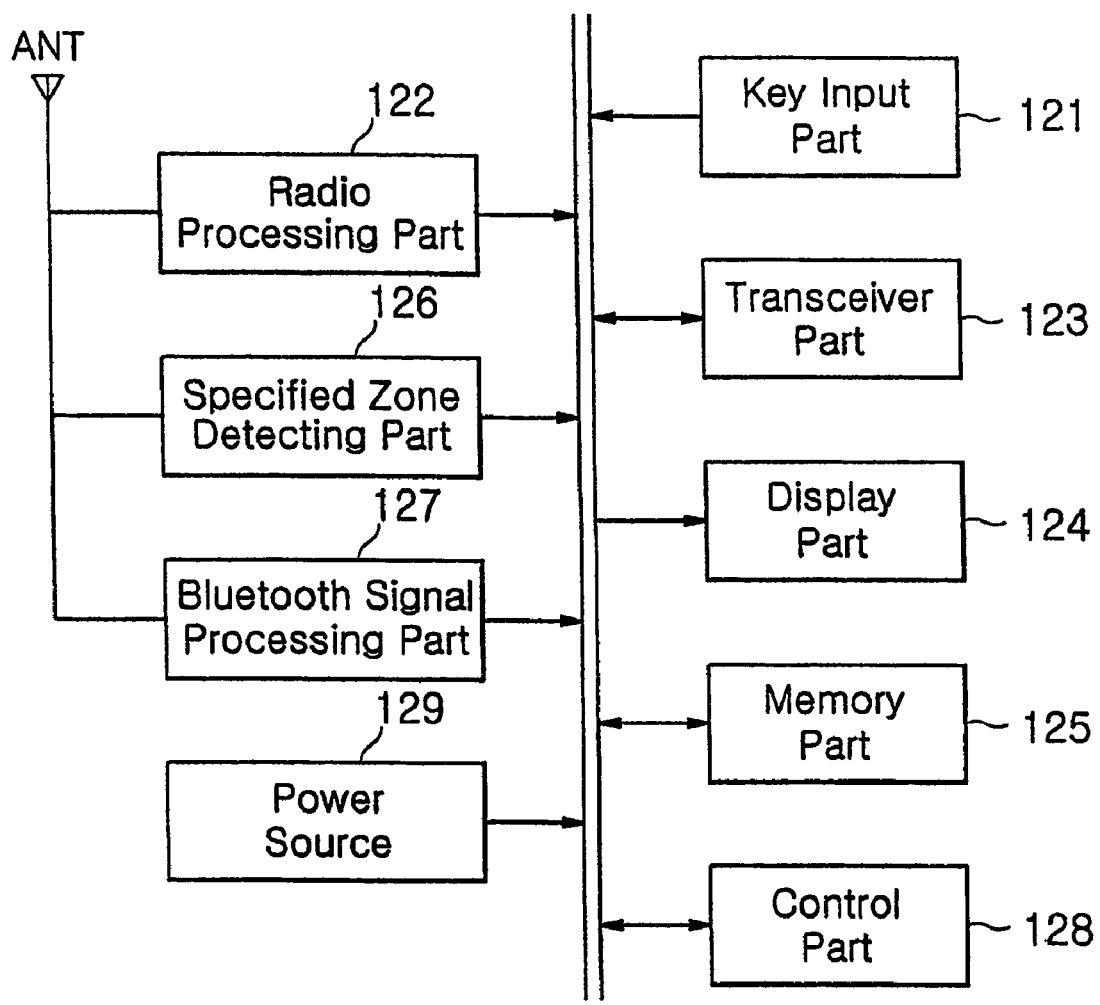
FIG. 6 illustrates the constitution of a mobile communication terminal in FIG. 5.

FIG. 6 illustrates the constitution of the Mobile Terminal in FIG. 5, which comprises the Key Input part (121), the Radio Processing part (122), the Transceiver part (123), the Display part (124), the Memory part (125), the Specified Zone Detecting part (126), the Bluetooth Signal Processing part (127), the Control part (128), and the Power Source (129).

The Key Input part (121) generates the telephone number needed for dialing and several types of key codes for inputting several kinds of setting values.

The Radio Processing part (122) transmits and receives radio data to/from the Base Station (200), the Transceiver part (123) enables users to respond and hear, and the Display part (124) displays several kinds of states that users can see when necessary and informations that the Mobile Terminal provides.

The Memory part (125) stores the system operating program and several kinds of data.

The Specified Zone Detecting part (126) detects the specified zone notifying frequency signal that the ZMS (400) periodically transmits, and controls the operating mode of the Bluetooth Signal Processing part (127) according to detecting the specified zone notifying frequency signal.

The Bluetooth Signal Processing part (127) is converted to the active mode under control of the Specified Zone Detecting part (126), and transmits the MIN information or the MAC address of the Mobile Terminal to the ZMS (400) through Bluetooth signal.

The Control part (128) controls the whole operation of the Mobile Terminal (120) and the Power Source (129) supplies power to the entire system.

Meanwhile, the Mobile Terminal that doesn't be equipped with the Specified Zone Detecting part (126) transmits the MIN information or the MAC address of the Mobile Terminal to The ZMS (400) through Bluetooth signal at the Bluetooth Signal Processing part (127) according to the location registration request message received from the ZMS (400).

Figure 7:
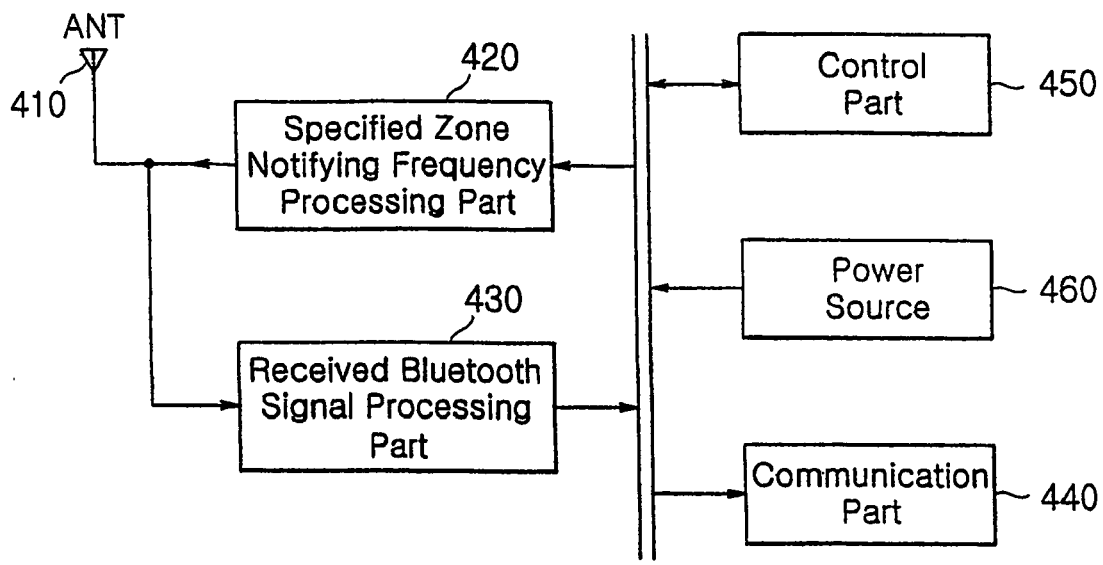
FIG. 7 illustrates the constitution of a zone management system according to one embodiment in FIG. 5.

FIG. 7 illustrates the constitution of the ZMS according to one embodiment in FIG. 5, which comprises the Antenna (410), the Specified Zone notifying frequency Processing part (420), the received Bluetooth signal processing part (430), the Communication part (440), the Control part (450), and the Power Source (460).

The Antenna (410) periodically transmits the specified zone notifying frequency signal and receives Bluetooth signal that the Mobile Terminal entering the specified zone transmits.

The specified zone notifying frequency processing part (420) periodically transmits the specified zone notifying frequency signal through the Antenna (410), and detects the entry of the Mobile Terminal (120) to a specified zone by receiving the specified zone notifying frequency signal.

The received Bluetooth signal processing part (430) acquires the MIN information or the MAC address by processing the Bluetooth signal received through the antenna (410).

If the received Bluetoth signal processing part (430) acquires the MIN information or MAC address, the control part (450) transmits the MIN information/MAC address and the zone identification information to the zone information management server (240) by controlling the communication part (440).

And, since the Mobile Terminal that is not equipped with the Specified Zone Detecting part (126) can not verify the its entry into a specific zone, the ZMS according to one embodiment in FIG. 7 may further comprises a transmitting Bluetooth Signal Processing part (not illustrated) that periodically transmits the location registration requesting message to the Antenna (410) through Bluetooth signal, in order that the mobile terminal without the specified zone detecting part (126) can perform the location registration.

Figure 8:
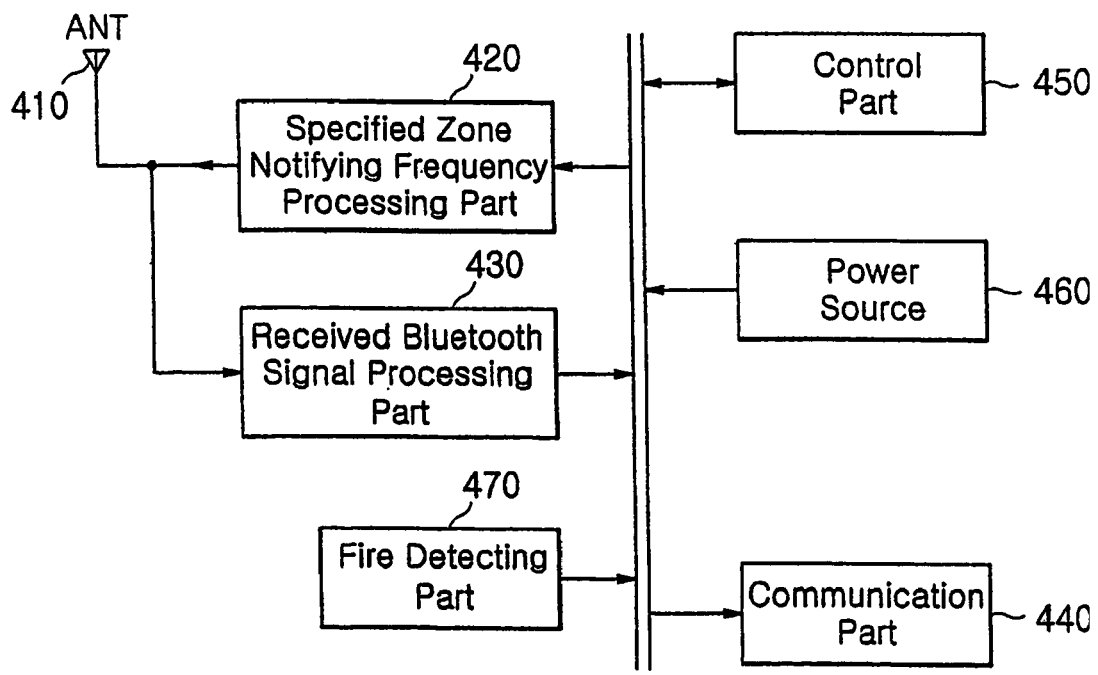
FIG. 8 illustrates the constitution of a zone management system according to another embodiment in FIG. 5.

FIG. 8 illustrates the constitution of the ZMS according to another embodiment in FIG. 5, which comprises the Antenna (410), the Specified Zone notifying frequency Processing part (420), the received Bluetooth signal processing part (430), the Fire Detecting part (470), the Communication part (440), the Control part (450), and the Power Source (460).

As the function and constitution of the Antennas (410), the Specified Zone notifying frequency Processing part (420), the received Bluetooth signal processing part (430), the Communication part (440), the Control part (450), and the Power Source (460) are similar to those of the one embodiment, the description of them is skipped.

But, the Fire Detecting part (470), which comprises the heat detecting sensor and the smoke detecting sensor installed at appropriate locations, detects outbreaks of fire, and notifies the Control part (450) of that accident when it senses an outbreak of fire.

The Control part (450) notifies the ZIMS (240) of the outbreak of fire by use of the signal inputted from the Fire Detecting part (470).

In order to request a location registration of the Mobile Terminal that is not equipped with the Specified Zone Detecting part (126), the ZMS according to another embodiment in FIG. 8 may further comprises the transmitting Bluetooth Signal Processing part (not illustrated) that periodically transmits the location registration requesting message to the Antenna (410) through Bluetooth signal.

Figure 9:
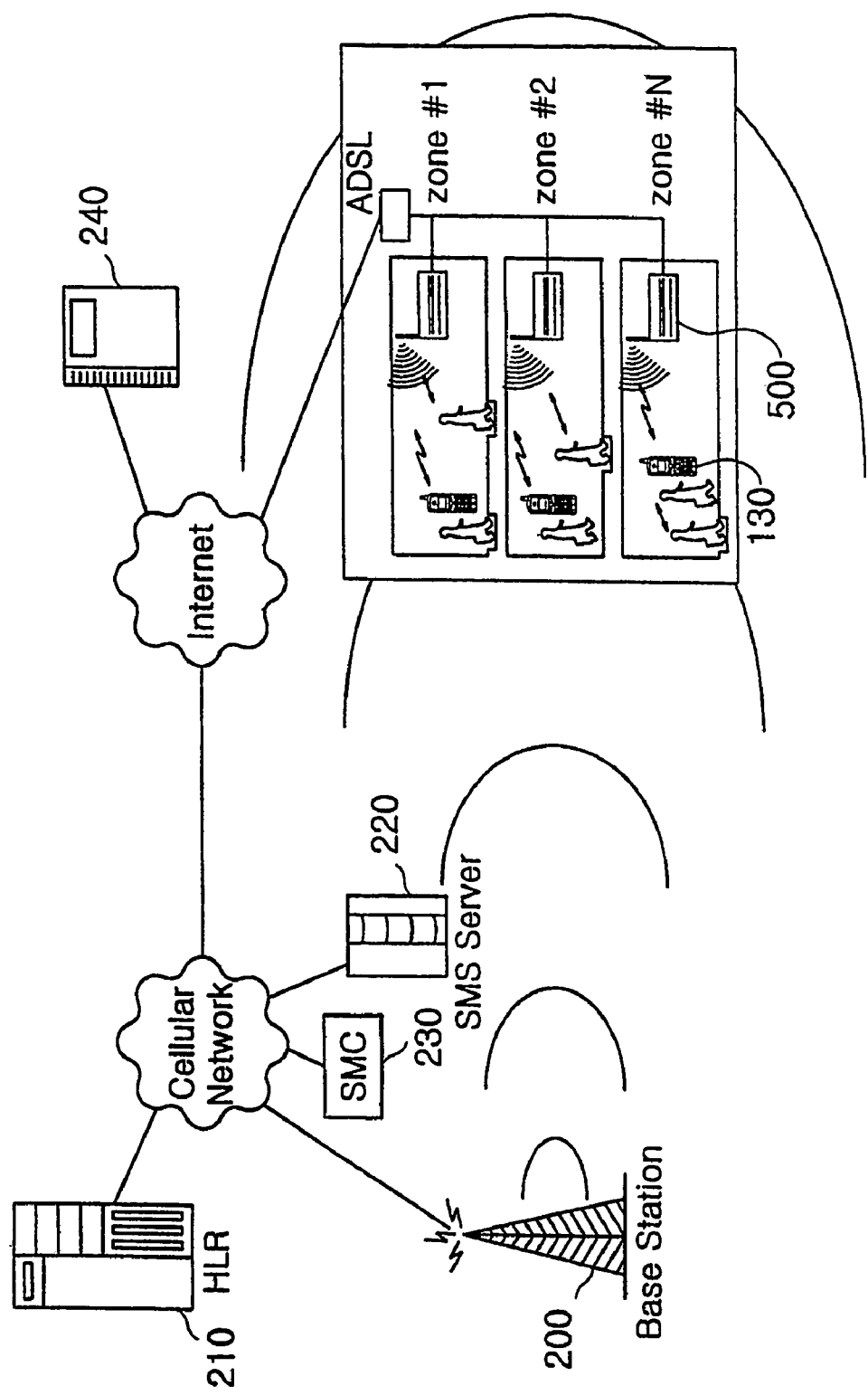
FIG. 9 illustrates a zone-based personalized information providing system according to yet another embodiment of the invention.

FIG. 9 illustrates a specified zone-based personalized information providing system according to yet another embodiment of the invention, which comprises the mobile communication terminal (MCT) (110), the Base Station Transceiver System (BTS) (200), HLR (Home Location Register) (210), SMS server (220), SMC (230), the Zone Management System (ZMS) (500), and the Zone Information Management Server (ZIMS) (240).

As the function and constitution of the BTS (200), HLR (210), SMS server (220), SMC (230), the Zone Management System (ZMS) (500), the Zone Information Management Server (ZIMS) (240) are similar to those of the one embodiment, the description of them is skipped.

But, the Mobile Terminal (130) converts the WLAN (Wireless LAN) chip to active mode by verifying the entry into a specified zone according to reception of the specified zone notifying frequency signal that the ZMS (500) periodically transmits, and transmits the MIN information or the MAC address to the ZMS (500) through the microwave of 2.4 GHz band for WLAN.

The Zone Management System (ZMS) (500), which is located in a specified zone, signifies that the area is the specified zone by periodically transmitting the specified zone notifying frequency signal, acquires the MIN information or the MAC address by receiving the microwave signal that the Mobile Terminal (130), which detects the entry into the specified zone according to reception of the specified zone notifying frequency signal, transmits, and provides information to be provided for the Mobile Terminal by transmitting the acquired MIN information/MAC address and the zone identification information to the ZMS (240).

The frequency signal of 900 MHz band can be used for the specified zone notifying frequency signal.

In addition, the ZMS (500) generates the location registration requesting message for the Mobile Terminal that can not verify the entry into a specified zone according to reception of the specified zone notifying frequency signal, and then transmits the generated location registration requesting message to the specified zone through microwave.

Figure 10:
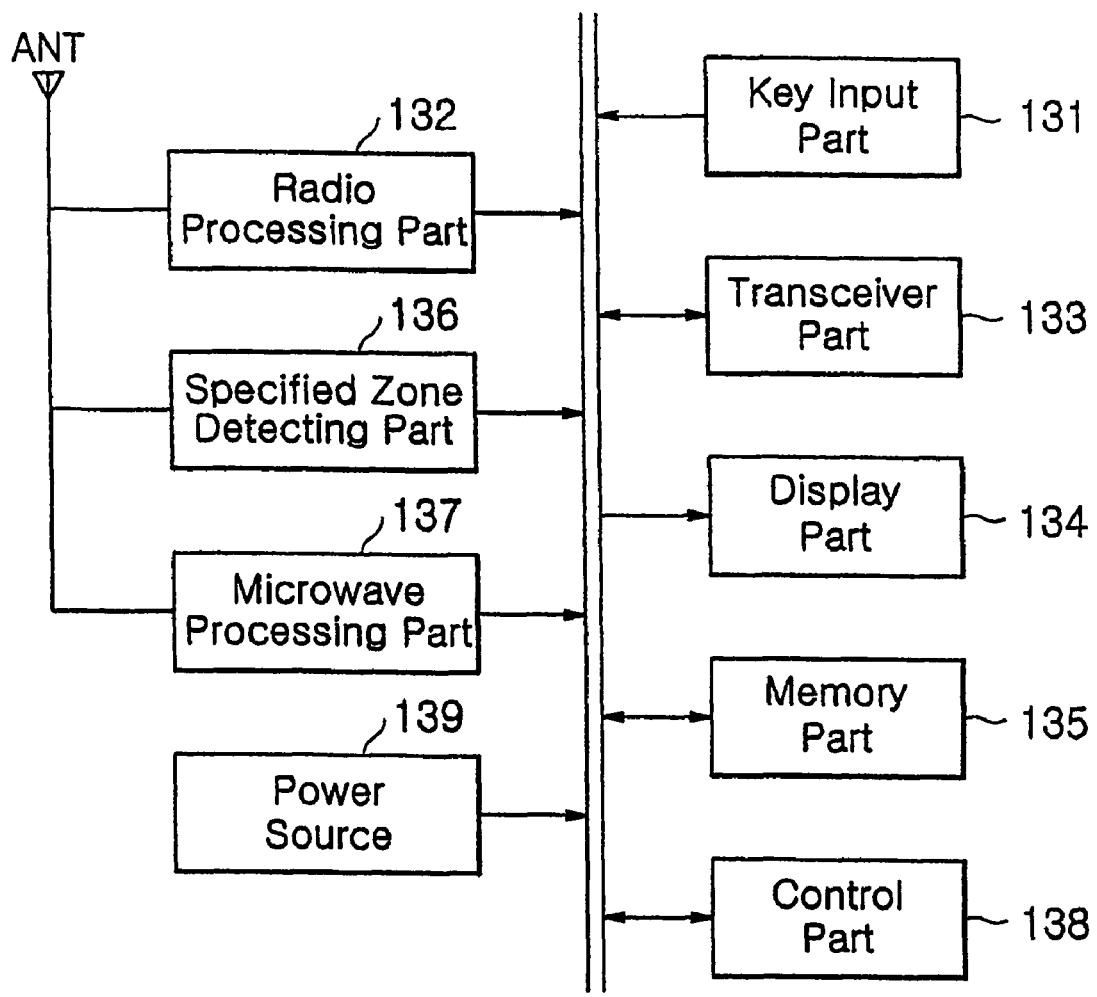
FIG. 10 illustrates the constitution of a mobile communication terminal in FIG. 9.

FIG. 10 illustrates the constitution of the Mobile Terminal in FIG. 9, which comprises the Key Input part (131), the Radio Processing part (132), the Transceiver part (133), the Display part (134), the Memory part (135), the Specified Zone Detecting part (136), the Microwave Processing part (137), the Control part (138), and the Power Source (139).

As the function and constitution of the Key Input part (131), the Radio Processing part (132), the Transceiver part (133), the Display part (134), the Memory part (135), the Control part (138), the Power Source (139) are similar to those of the one embodiment, the description of them is skipped.

The Specified Zone Detecting part (136) detects the specified zone notifying frequency signal that the ZMS (500) periodically transmits, and controls the operating mode of the Microwave Processing part (137) according to detecting the specified zone notifying frequency signal.

The Microwave Processing part (137) is converted to the active mode under control of the Specified Zone Detecting part (136), and transmits the MIN information or the MAC address of the Mobile Terminal to The ZMS (500) through microwave.

Meanwhile, the mobile terminal that is not equipped with the specified zone detecting part (136) transmits the MIS information of the mobile terminal or MAC address in the microwave processing part (137) through microwave according to the location registration request message received from the ZMS (500).

Figure 11:
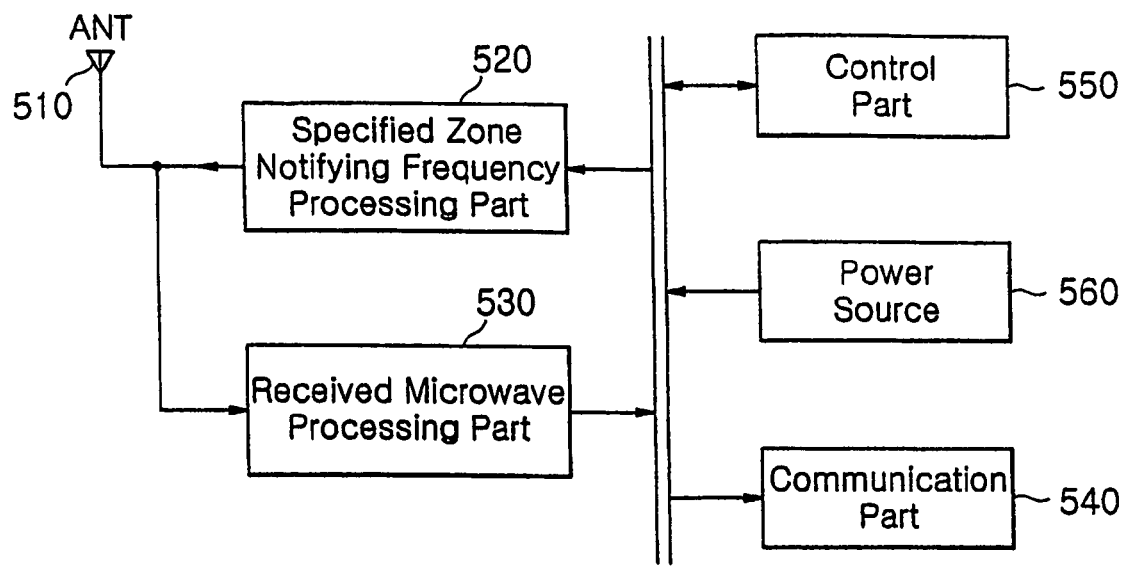
FIG. 11 illustrates the constitution of a zone management system according to one embodiment in FIG. 9.

FIG. 11 illustrates the constitution of the ZMS according to one embodiment in FIG. 9, which comprises the Antenna (510), the Specified Zone notifying frequency Processing part (520), the received microwave processing part (530), the Communication part (540), the Control part (550), and the Power Source (560).

The antenna (510) periodically transmits the zone notifying frequency signal and receives the microwave that the Mobile Terminal (130) entering the specified zone transmits.

The Specified Zone notifying frequency processing frequency part (520) periodically transmits the specified zone notifying frequency signal through the Antenna (510), and detects the entry of the Mobile Terminal (130) to a specified zone by receiving the specified zone notifying frequency signal.

The received Microwave processing part (530) acquires the MIN information or the MAC address by processing the microwave signal received through the antenna (510).

If the received microwave processing part (530) acquires the MIN information, the control part (550) transmits the MIN information/MAC address and the zone identification information to the zone information management server (240) by controlling the communication part (540).

In order to request a location registration of the Mobile Terminal that is not equipped with the Specified Zone Detecting part (136), the ZMS according to one embodiment in FIG. 11 may further comprises the Transmitting Microwave Processing part (not illustrated) that periodically transmits the location registration requesting message to the Antenna (510) through microwave.

Figure 12:
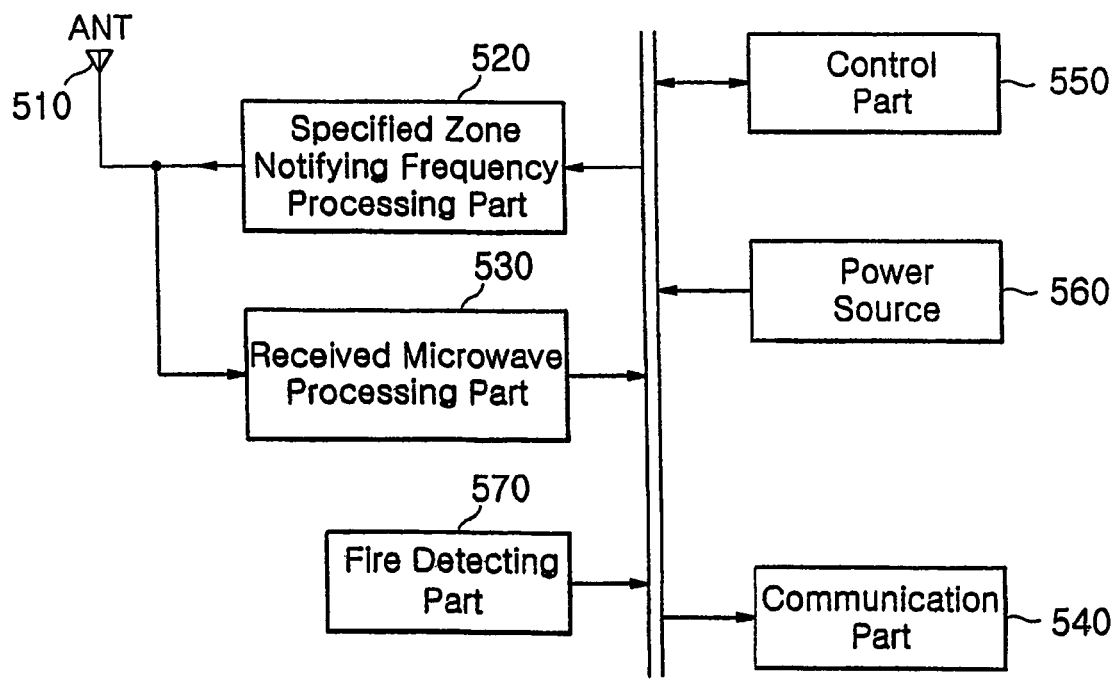
FIG. 12 illustrates the constitution of a zone management system according to another embodiment in FIG. 9.

FIG. 12 illustrates the constitution of the ZMS according to another embodiment in FIG. 9, which comprises the Antenna (510), the Specified Zone notifying frequency processing frequency part (520), the received Microwave processing part (530), the Fire Detecting part (570), the Communication part (540), the Control part (550), and the Power Source (560).

As the function and constitution of the Antennas (510), the Specified Zone notifying frequency Processing part (520), the received microwave signal processing part (530), the Communication part (540), and the Power Source (560) are similar to those of the one embodiment, the description of them is to be skipped.

But, the Fire Detecting part (570), which comprises the heat detecting sensor and the smoke detecting sensor installed at appropriate locations, detects outbreaks of fire, and notifies the Control part (550) of that accident when it senses an outbreak of fire.

The Control part (550) notifies the ZIMS (240) of the outbreak of fire according to the signal inputted from the Fire Detecting part (570).

In order to request a location registration of the Mobile Terminal (130) that is not equipped with the Specified Zone Detecting part (136), the ZMS according to one embodiment in FIG. 11 may further comprises the Transmitting Microwave Processing part (not illustrated) that periodically transmits the location registration requesting message to the Antenna (510) through microwave.

Figure 13:
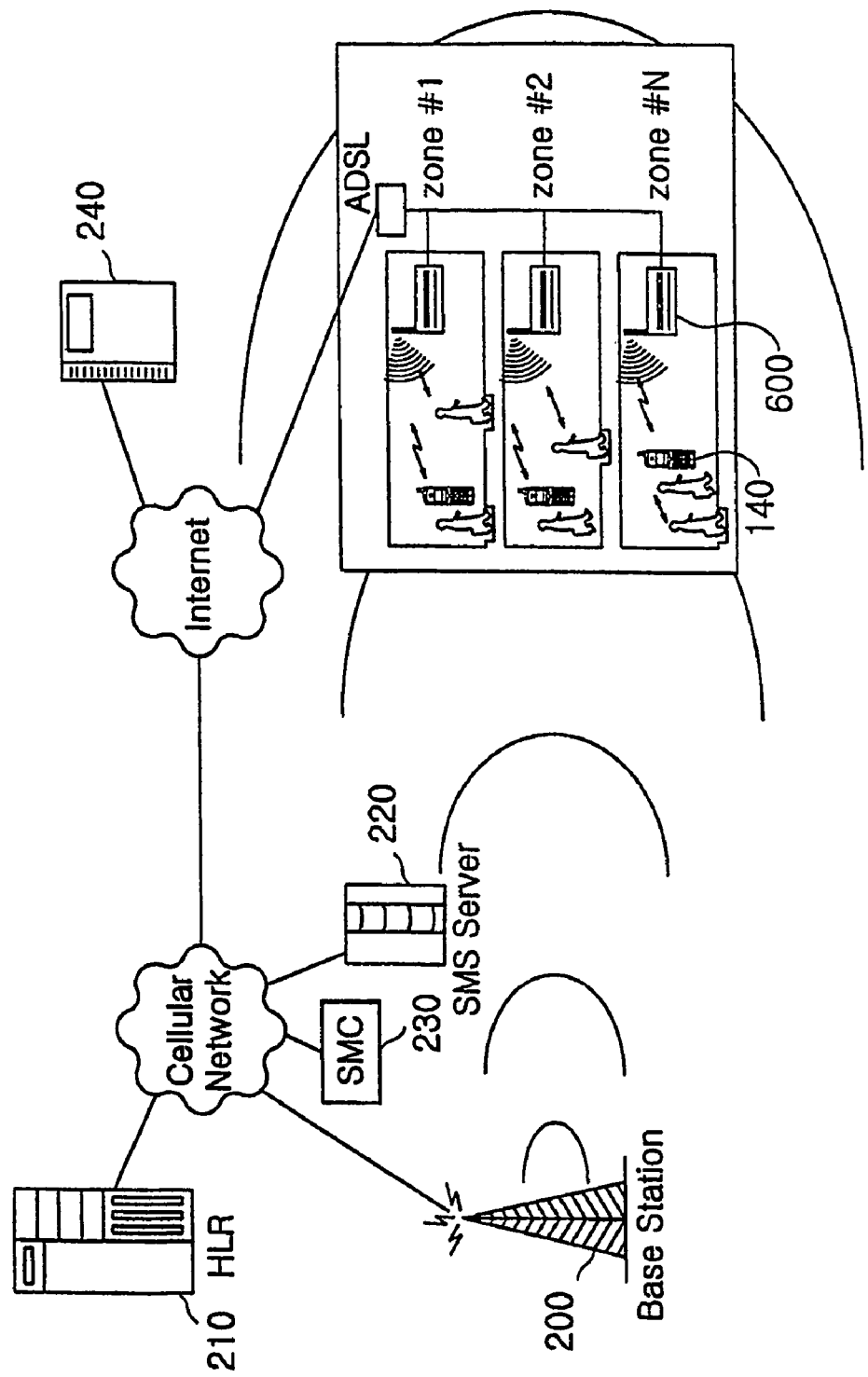
FIG. 13 illustrates a zone-based personalized information providing system according to still another embodiment of the invention.

FIG. 13 illustrates the Specified Zone-based Personalized Information Providing system still according to another embodiment of the invention, which comprises the mobile communication terminal (MCT) (140), the Base Station Transceiver System (BTS) (200), HLR (210), SMS server (220), SMC (230), the Zone Management System (ZMS) (600), and the Zone Information Management Server (ZIMS) (240).

As the function and constitution of the BTS (200), HLR (210), SMS server (220), SMC (230), the Zone Information Management Server (ZIMS) (240) are similar to those of the one embodiment, the description of them is skipped.

But, the Mobile Terminal (140) converts the BCDMA (Binary CDMA) chip to active mode by verifying the entry into a specified zone according to reception of the specified zone notifying frequency signal that the ZMS (600) periodically transmits, and transmits the MIN information or the MAC address to the ZMS (600) through the BCDMA.

The ZMS (600), which is located in a specified area, signifies that the area is the specified zone by periodically transmitting the specified zone notifying frequency signal, acquires the MIN information/the MAC address by receiving the BCDMA signal that the Mobile Terminal (130), which detects the entry into a specified zone according to reception of the specified zone notifying frequency signal, transmits, and provides information to be provided for the Mobile Terminal by transmitting the acquired MIN information or MAC address and the zone identification information to the ZMS (240).

The frequency signal of 900 MHz band can be used for the specified zone notifying frequency signal.

In addition, the ZMS (600) generates the location registration requesting message for the Mobile Terminal that can not verify the entry of a specified zone according to reception of the specified zone notifying frequency signal, and transmits the generated location registration requesting message to the specified zone through BCDMA signal.

Figure 14:
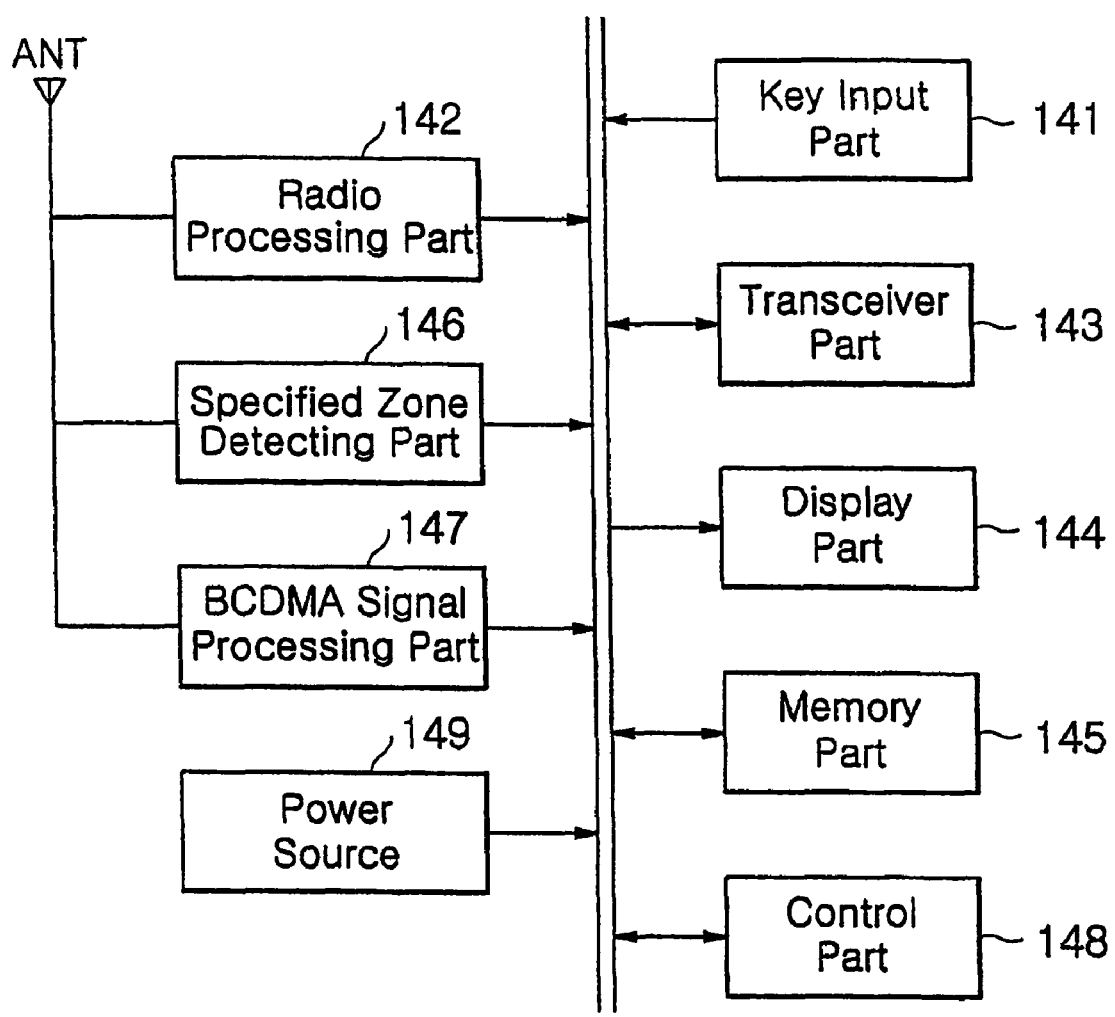
FIG. 14 illustrates the constitution of a mobile communication terminal in FIG. 13.

FIG. 14 illustrates the constitution of the Mobile Terminal in FIG. 13, which comprises the Key Input part (141), the Radio Processing part (142), the Transceiver part (143), the Display part (144), the Memory part (145), the Specified Zone Detecting part (146), the BCDMA signal Processing part (147), the Control part (148), and the Power Source (149).

As the function and constitution of the Key Input part (141), the Radio Processing part (142), the Transceiver part (143), the Display part (144), the Memory part (145), the Control part (148), and the Power Source (149) are similar to those of the one embodiment, the description of them is skipped.

But, the Specified Zone Detecting part (146) detects the specified zone notifying frequency signal that the ZMS (600) periodically transmits, and controls the operating mode of the BCDMA Signal Processing part (147) according to detecting the specified zone notifying frequency signal.

The BCDMA Signal Processing part (147) is converted to the active mode under control of the Specified Zone Detecting part (146), and transmits the MIN information or the MAC address of the Mobile Terminal to The ZMS (600) through BCDMA signal.

Meanwhile, the Mobile Terminal that is not equipped with the Specified Zone Detecting part (146) transmits the MIN information or the MAC address of the Mobile Terminal to The ZMS (600) through BCDMA signal at the BCDMA Signal Processing part (147) according to the location registration message received from the ZMS (600).

Figure 15:
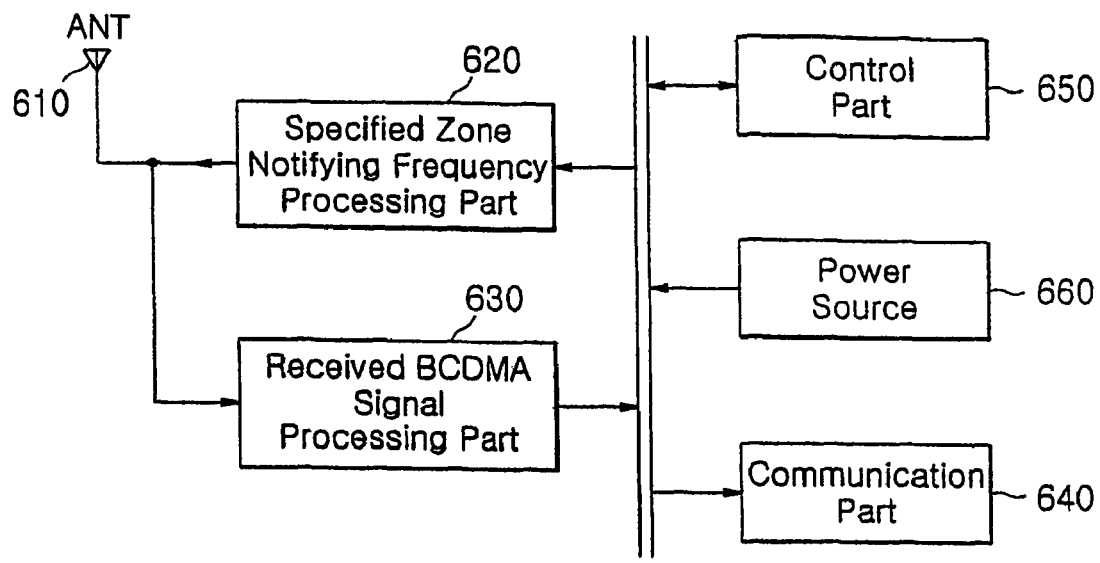
FIG. 15 illustrates the constitution of a zone management system according to one embodiment in FIG. 13.

FIG. 15 illustrates the constitution of the ZMS according to one embodiment in FIG. 13, which comprises the Antenna (610), the Specified Zone notifying frequency Processing part (620), the received BCDMA processing part (630), the Communication part (640), the Control part (650), and the Power Source (660).

Wherein Antennas (610) periodically transmits the specified zone notifying frequency signal and receives BCDMA signal the entering the Mobile Terminal (140) transmits.

The Specified Zone notifying frequency Processing part (620) periodically transmits the specified zone notifying frequency signal through the Antenna (610), and detects the entry of the Mobile Terminal (140) to a specified zone by receiving the specified zone notifying frequency signal.

The received BCDMA processing part (630) acquires the MIN information or the MAC address by processing the BCDMA signal received through the antenna (610)s.

The Control part (650) acquires the MIN information in the received BCDMA processing part (630), and transmits the MIN information and the zone identification information to the zone information management server (240) by controlling the communication part (640).

In order to request a location registration of the Mobile Terminal (140) that is not equipped with the Specified Zone Detecting part (146), the ZMS according to one embodiment in FIG. 15 may further comprises the Transmitting BCDMA Processing part (not illustrated) that periodically transmits the location registration requesting message to The Antenna (610) through BCDMA signal.

Figure 16:
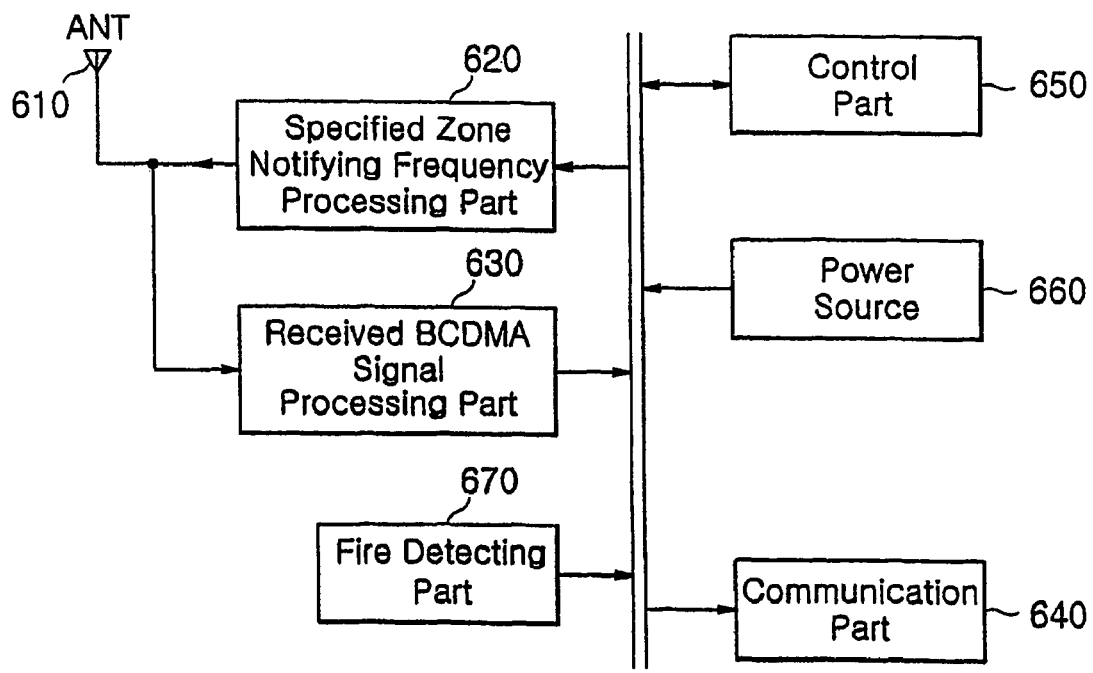
FIG. 16 illustrates the constitution of a zone management system according to another embodiment in FIG. 13.

FIG. 16 illustrates the constitution of the ZMS according to another embodiment in FIG. 13, which comprises the Antenna (610), the Specified Zone notifying frequency Processing part (620), and the received BCDMA signal processing part (630), the Fire Detecting part (670), the Communication part (640), the Control part (650), and the Power Source (660).

As the function and constitution of the Antennas (610), the Specified Zone notifying frequency Processing part (620), and the received BCDMA signal processing part (630) are similar to those of the one embodiment, the description of them is to be skipped.

But, the Fire Detecting part (670), which comprises the heat detecting sensor and the smoke detecting sensor installed at appropriate locations, detects outbreaks of fire, and notifies the Control part (650) of that accident when it senses an outbreak of fire.

The Control part (650) notifies the ZIMS (240) of the outbreak of fire by use of the signal inputted from the Fire Detecting part (670).

In order to request a location registration of the Mobile Terminal (140) that is not equipped with the Specified Zone Detecting part (146), the ZMS (600) according to another embodiment in FIG. 16 may further comprises the Transmitting BCDMA signal Processing part (not illustrated) that periodically transmits the location registration requesting message to the Antenna (610) through BCDMA signal.

Figure 17:
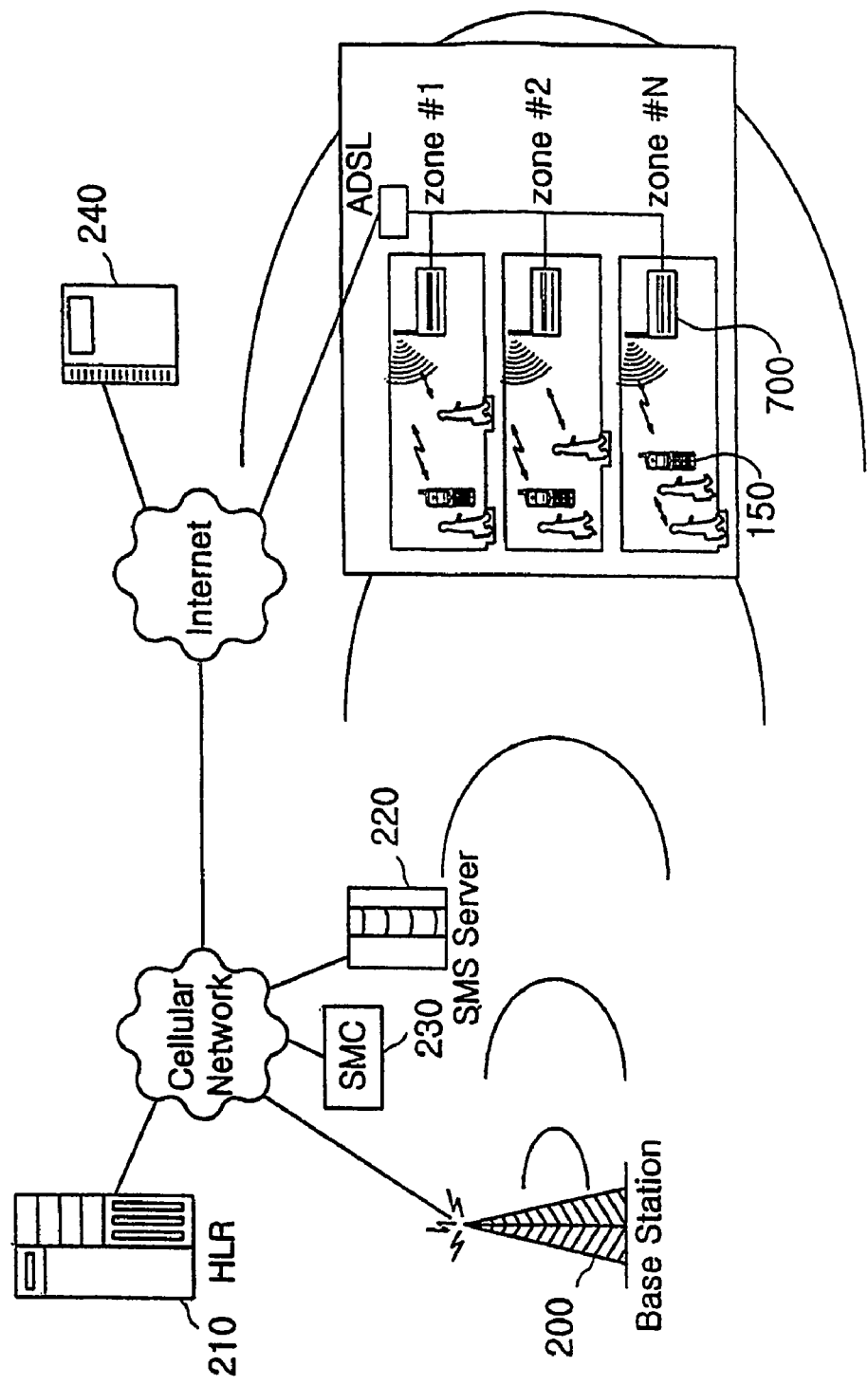
FIG. 17 illustrates a zone-based personalized information providing system according to still another embodiment of the invention.

FIG. 17 illustrates the Specified Zone Personalized Information Providing system according to still another embodiment of the invention, which comprises the mobile communication terminal (MCT) (150), the Base Station Transceiver System (BTS) (200), HLR (210), SMS server (220), SMC (230), the Zone Management System (ZMS) (700), and the Zone Information Management Server (ZIMS) (240).

As the function and constitution of the BTS (200), HLR (210), SMS server (220), SMC (SMS Message Center) (230), the Zone Information Management Server (ZIMS) (240) are similar to those of the one embodiment, the description of them is skipped.

But, the Mobile Terminal (150) converts the ZigBee (IEEE 802.15.4) chip to active mode by verifying the entry of a specified zone according to reception of the specified zone notifying frequency signal that the ZMS periodically transmits, and transmits the MIN information or the MAC address to the ZMS (700) through the microwave of 2.4 GHz band/915 MHz band/868 MHz band which are frequency bands for ZigBee.

The Zone Management System (ZMS) (700), which is located in a specified area, signifies that the area is the specified zone by periodically transmitting the zone notifying frequency signal, acquires the MIN information or the MAC address by receiving the microwave signal that the Mobile Terminal (150), which detects the entry into a specified zone according to reception of the specified zone notifying frequency signal, transmits, and provides information to be provided for the Mobile Terminal (150) by transmitting the acquired MIN information/MAC address and the zone identification information to the ZMS (240).

The frequency signal of 900 MHz band can be used for the specified zone notifying frequency signal.

In addition, the ZMS (700) generates the location registration requesting message for the Mobile Terminal that can not verify the entry into a specified zone according to reception of the zone notifying frequency signal, transmits the generated location registration requesting message to the specified zone through microwave.

Figure 18:
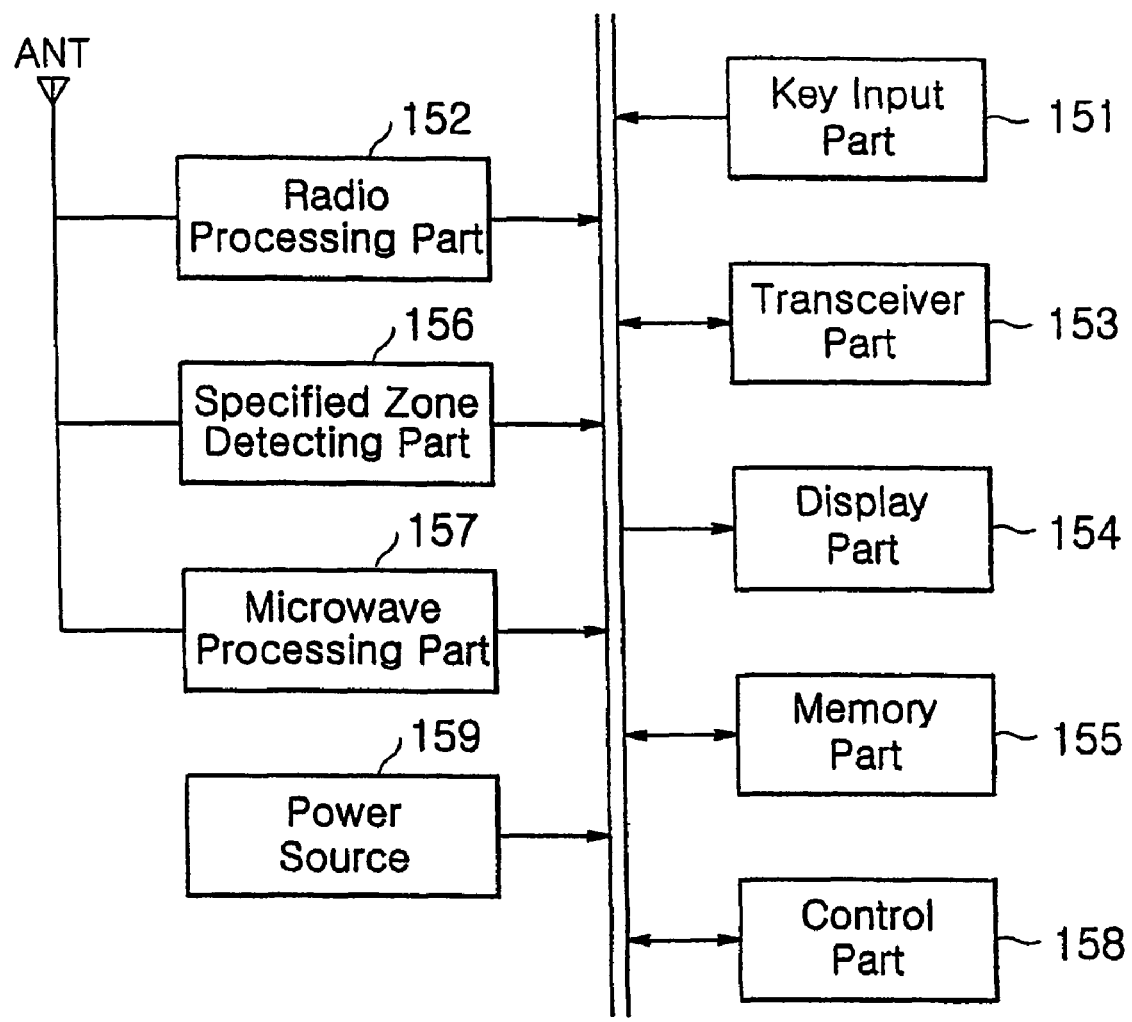
FIG. 18 illustrates the constitution of a mobile communication terminal in FIG. 17.

FIG. 18 illustrates the constitution of the Mobile Terminal in FIG. 17, which comprises the Key Input part (151), the Radio Processing part (152), the Transceiver part (153), the Display part (154), the Memory part (155), the Specified Zone Detecting part (156), the Microwave Processing part (157), the Control part (158), and the Power Source (159).

As the function and constitution of the Key Input part (151), the Radio Processing part (152), the Transceiver part (153), the Display part (154), the Memory part (155), the Control part (158), the Power Source (159) are similar to those of the another embodiment, the description of them is skipped.

But, the Specified Zone Detecting part (156) detects the specified zone notifying frequency signal that the ZMS (700) periodically transmits, controls the operating mode of the Microwave Processing part (157) according to detecting the specified zone notifying frequency signal.

The Microwave Processing part (157) is converted to the active mode under control of the Specified Zone Detecting part (156), and transmits the MIN information or the MAC address of the Mobile Terminal to The ZMS (700) through microwave.

Meanwhile, the Mobile Terminal that is not equipped with the Specified Zone Detecting part (156) transmits the MIN information or the MAC address of the Mobile Terminal to the ZMS (700) through microwave at the Microwave Processing part (157) according to the location registration message received from the ZMS (700).

Figure 19:
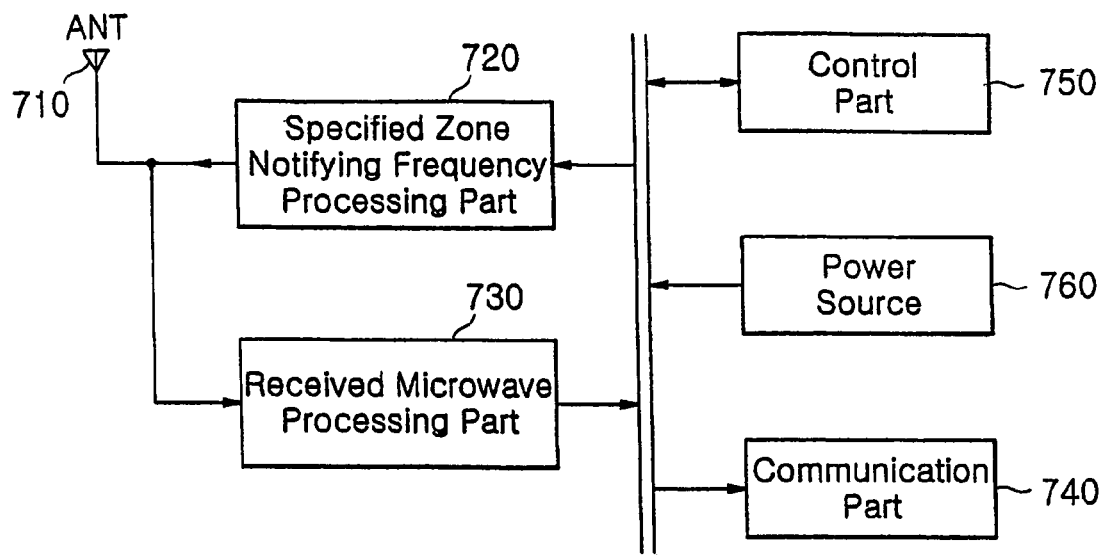
FIG. 19 illustrates the constitution of a zone management system according to one embodiment in FIG. 17.

FIG. 19 illustrates the constitution of the ZMS according to one embodiment in FIG. 17, which comprises the Antenna (710), the Specified Zone notifying frequency Processing part (720), the Received Microwave processing part (730), the Communication part (740), the Control part (750), the Power Source (760).

The Antenna (710) periodically transmits the specified zone notifying frequency signal and receives microwave the entering Mobile Terminal (150) transmits.

The Specified Zone notifying frequency processing part (720) periodically transmits the specified zone notifying frequency signal through the Antenna (710), and detects the entry of the Mobile Terminal (150) into a specified zone by receiving the specified zone notifying frequency signal.

The Microwave processing part (730) acquires the MIN information or the MAC address by processing the microwave received from the antenna (710).

If the received microwave processing part (730) acquires the MIN information, the Control part (750) transmits the MIN information/MAC address and the zone identification information to the zone information management server (240) by controlling the communication part (740).

In order to request a location registration of the Mobile Terminal (150) that is not equipped with the Specified Zone Detecting part (156), the ZMS (700) according to one embodiment in FIG. 19 may further comprises the Transmitting microwave Processing part (not illustrated) that periodically transmits the location registration requesting message to the Antenna (710) through microwave.

Figure 20:
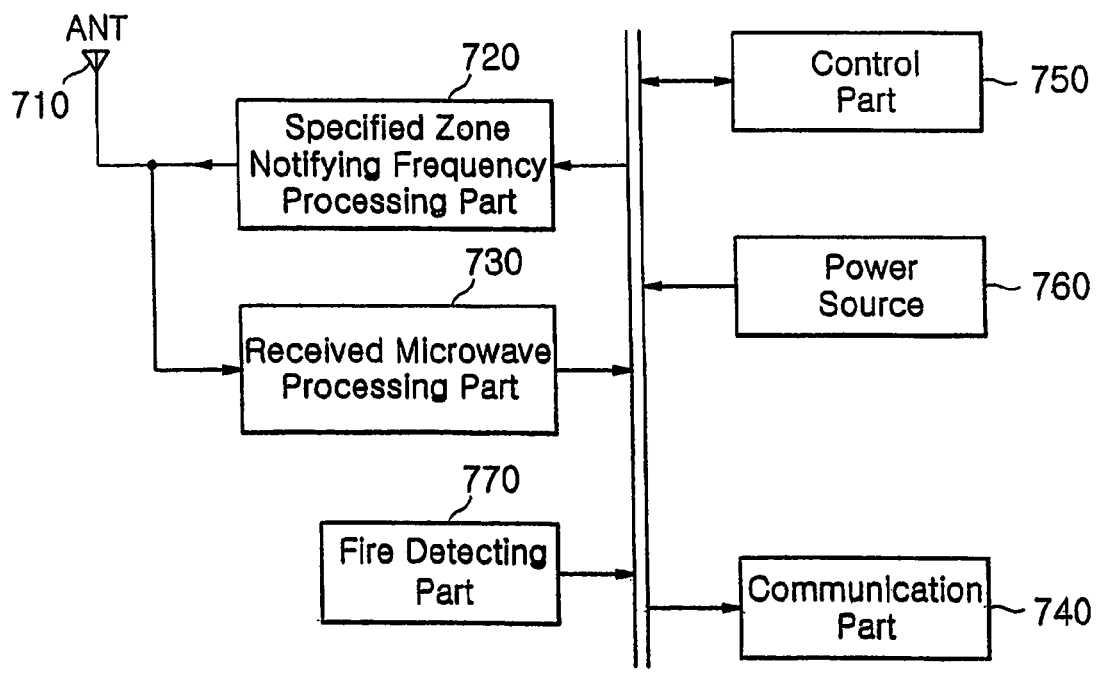
FIG. 20 illustrates the constitution of a zone management system according to another embodiment in FIG. 17.

FIG. 20 illustrates the constitution of the ZMS according to another embodiment in FIG. 17, which comprises the Antenna (710), the Specified Zone notifying frequency processing part (720), the received Microwave signal processing part (730), the Fire Detecting part (770), the Communication part (740), the Control part (750), and the Power Source (760).

As the function and constitution of the Antennas (710), the Specified Zone notifying frequency processing part (720), the received Microwave signal processing part (730), the Communication part (740), and the Power Source (760) are similar to those of the one embodiment, the description of them is to be skipped.

But, the Fire Detecting part (770), which comprises the heat detecting sensor and the smoke detecting sensor installed at appropriate locations, detects outbreaks of fire, and notifies the Control part (750) of that accident when it senses an outbreak of fire.

The Control part (750) notifies the ZIMS (240) of the outbreak of fire by use of the signal inputted from the Fire Detecting part (770).

In order to request a location registration of the Mobile Terminal (150) that doesn't be equipped with the Specified Zone Detecting part (156), the ZMS (700) according to another embodiment in FIG. 20 may further comprises the Transmitting Microwave signal Processing part (not illustrated) that periodically transmits the location registration requesting message to the Antenna (710) through microwave.

Figure 21:
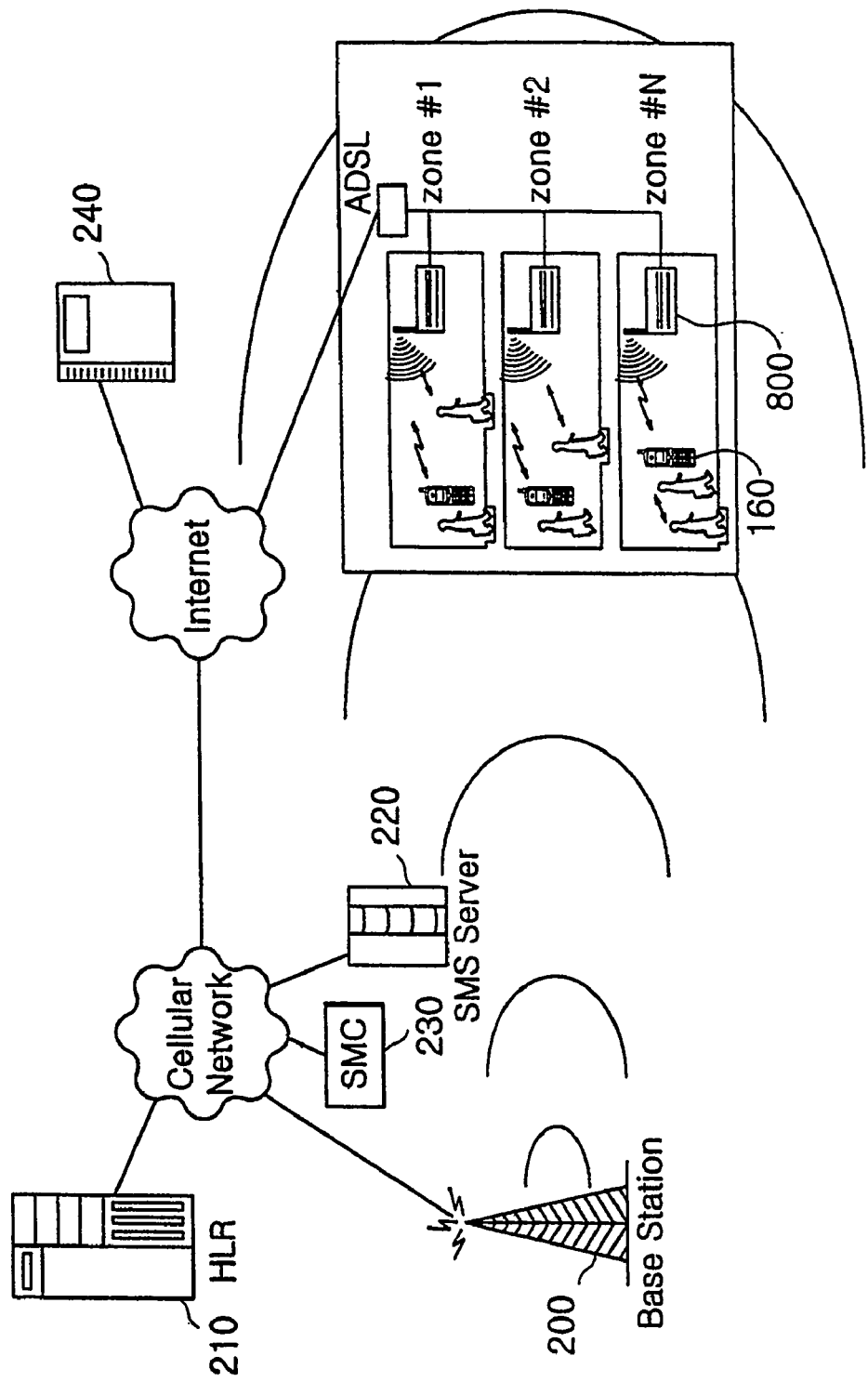
FIG. 21 illustrates a zone-based personalized information providing system according to still another embodiment of the invention.

FIG. 21 illustrates the Specified Zone-based Personalized Information Providing system according to still another embodiment of the invention, which comprises the mobile communication terminal (MCT) (150), the Base Station Transceiver System (BTS) (200), HLR (210), SMS server (220), SMC (230), the Zone Management System (ZMS) (800), the Zone Information Management Server (ZIMS) (240).

As the function and constitution of the BTS (200), HLR (210), SMS server (220), SMC (230), and the Zone Information Management Server (ZIMS) (240) are similar to those of the one embodiment, the description of them is skipped.

But, the Mobile Terminal (160) converts the RFID (Radio Frequency Identification) chip to active mode by verifying the entry into a specified zone according to reception of the specified zone notifying frequency signal that the ZMS periodically transmits, and transmits the MIN information or the MAC address to the ZMS (800) through the radio wave (The frequency band of 10 KHz to 300 GHz is used for radio wave, but the low-frequency wave of 134.2 KHz is mainly used).

The Zone Management System (ZMS) (800), which is located in a specified area, signifies that the area is the specified zone by periodically transmitting the specified zone notifying frequency signal, acquires the MIN information/the MAC address by receiving the radio wave signal that the Mobile Terminal (160), which detects the entry into a specified zone according to reception of the zone notifying frequency signal, transmits, and provides information to be provided for the Mobile Terminal (160) by transmitting the acquired MIN information/MAC address and the zone identification information to the ZIMS (240).

The frequency signal of 900 MHz Band can be used for the specified zone notifying frequency signal.

In addition, the ZMS (800) generates the location registration requesting message for the Mobile Terminal that can not verify the entry of a specified zone according to reception of the specified zone notifying frequency signal, and transmits the generated location registration requesting message to the specified zone through radio wave.

Figure 22:
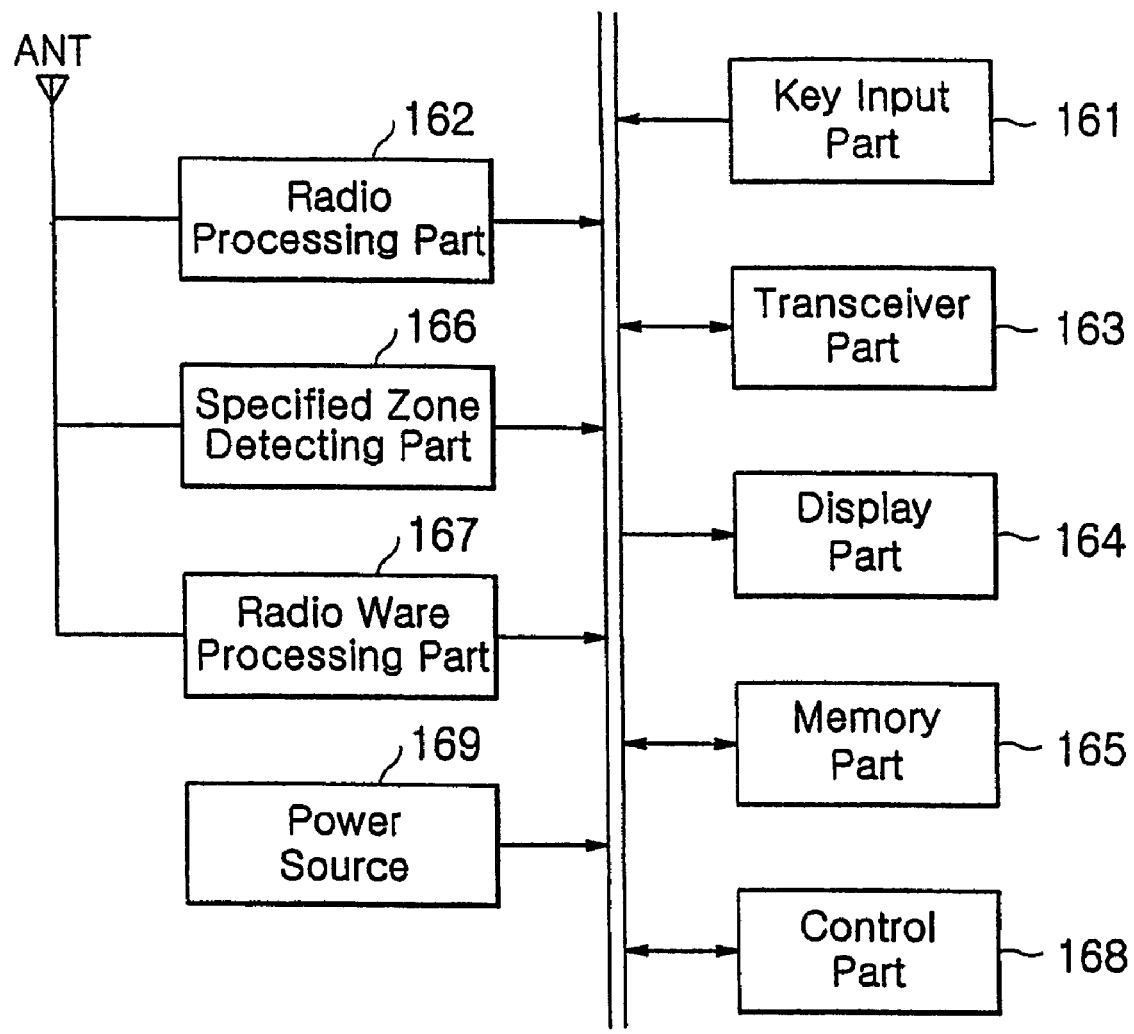
FIG. 22 illustrates the constitution of a mobile communication terminal in FIG. 21.

FIG. 22 illustrates the constitution of the Mobile Terminal in FIG. 21, which comprises the Key Input part (161), the Radio Processing part (162), the Transceiver part (163), the Display part (164), the Memory part (165), the Specified Zone Detecting part (166), the Radio wave Processing part (167), the Control part (168), and the Power Source (169).

As the function and constitution of the Key Input part (161), the Radio Processing part (162), the Transceiver part (163), the Display part (164), the Memory part (165), the Control part (168), and the Power Source (169) are similar to those of the another embodiment, the description of them is skipped.

But, the Specified Zone Detecting part (166) detects the specified zone notifying frequency signal that the ZMS (800) periodically transmits, and controls the operating mode of the Radio wave Processing part (167) according to detecting the specified zone notifying frequency signal.

The Radio wave Processing part (167) is converted to the active mode under control of the Specified Zone Detecting part (166), and transmits the MIN information or the MAC address of the Mobile Terminal to The ZMS (800) through radio wave.

Meanwhile, the Mobile Terminal (160) that is not equipped with the Specified Zone Detecting part (166) transmits the MIN information or the MAC address of the Mobile Terminal to the ZMS (800) through radio wave at the Radio wave Processing part (167) according to the location registration message received from the ZMS (800).

Figure 23:
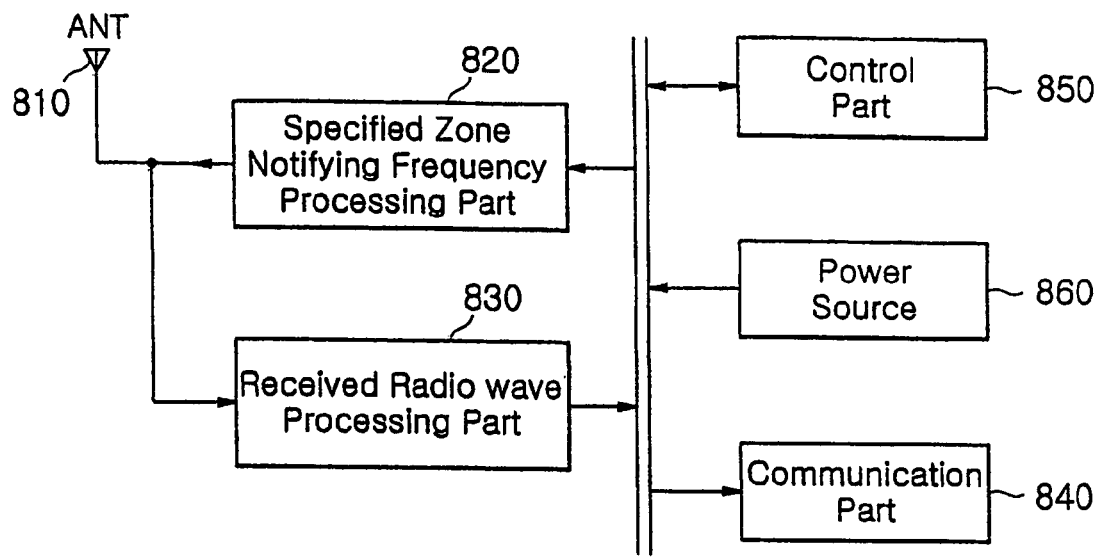
FIG. 23 illustrates the constitution of a zone management system according to one embodiment in FIG. 21.

FIG. 23 illustrates the constitution of the ZMS according to one embodiment in FIG. 21, which comprises the Antenna (810), the Specified Zone notifying frequency processing part (820), the received Radio wave processing part (830), the Communication part (840), the Control part (850), and the Power Source (860).

The antenna (810) periodically transmits the specified zone notifying frequency signal and receives radio wave the entering Mobile Terminal (160) transmits.

The specified zone notifying frequency processing part (820) periodically transmits the zone notifying frequency signal through the Antenna (810), and detects the entry of the Mobile Terminal (160) into a specified zone by receiving the specified zone notifying frequency signal.

The radio wave processing part (830) acquires the MIN information or the MAC address by processing the Radio-wave received from the antenna (810).

If the received radio wave processing part (830) acquires the MIN information, the Control part (850) transmits the MIN information/MAC address and the zone identification information to the zone information management server (240) by controlling the communication part (840).

In order to request a location registration of the Mobile Terminal (160) that is not equipped with the Specified Zone Detecting part (166), the ZMS (800) according to one embodiment in FIG. 19 may further comprise the Transmitting microwave Processing part (not illustrated) that periodically transmits the location registration requesting message to the Antenna (810) through radio wave.

Figure 24:
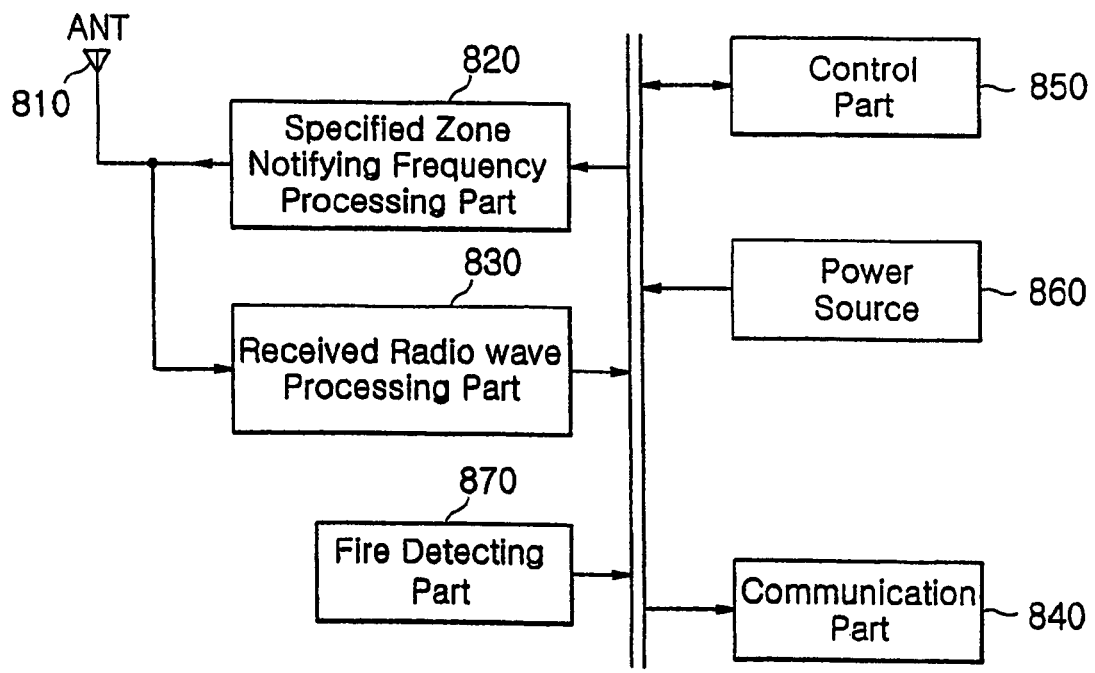
FIG. 24 illustrates the constitution of a zone management system according to another embodiment in FIG. 21.

FIG. 24 illustrates the constitution of the ZMS according to another embodiment in FIG. 21, which comprises the Antenna (810), the specified zone notifying frequency processing part (820), the received radio wave signal processing part (830), the Fire Detecting part (870), the Communication part (840), the Control part (850), the Power Source (860).

As the function and constitution of the Antennas (810), the Specified Zone notifying frequency processing part (820), the received radio wave signal processing part (830), the Communication part (840), and the Power Source (860) are similar to those of the one embodiment, the description of them is to be skipped.

But, the Fire Detecting part (870), which comprises the heat detecting sensor and the smoke detecting sensor installed at appropriate locations, detects outbreaks of fire, and notifies the Control part (850) of that accident when it senses an outbreak of fire.

The Control part (850) notifies the ZIMS (240) of the outbreak of fire by use of the signal inputted from the Fire Detecting part (870).

In order to request a location registration of the Mobile Terminal (160) that doesn't be equipped with the Specified Zone Detecting part (166), the ZMS (800) according to another embodiment in FIG. 24 may further comprise the Transmitting Radio wave Signal Processing part (not illustrated) that periodically transmits the location registration requesting message to the Antenna (810) through radio wave.

Figure 25A:
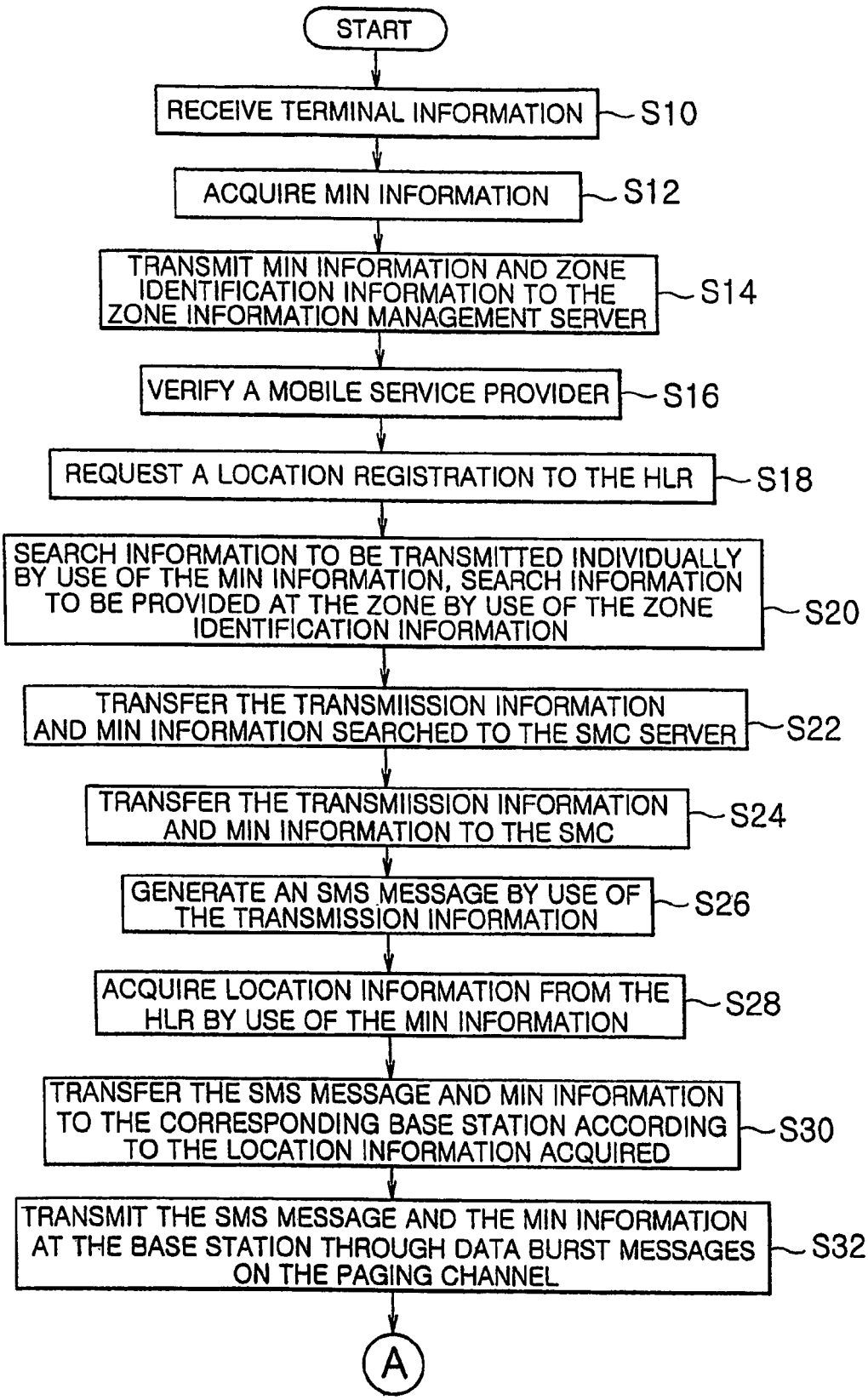
FIG. 25a and FIG. 25b are flowcharts for illustrating a method for providing a zone-based personalized information according to an embodiment of the invention.
Figure 25B:
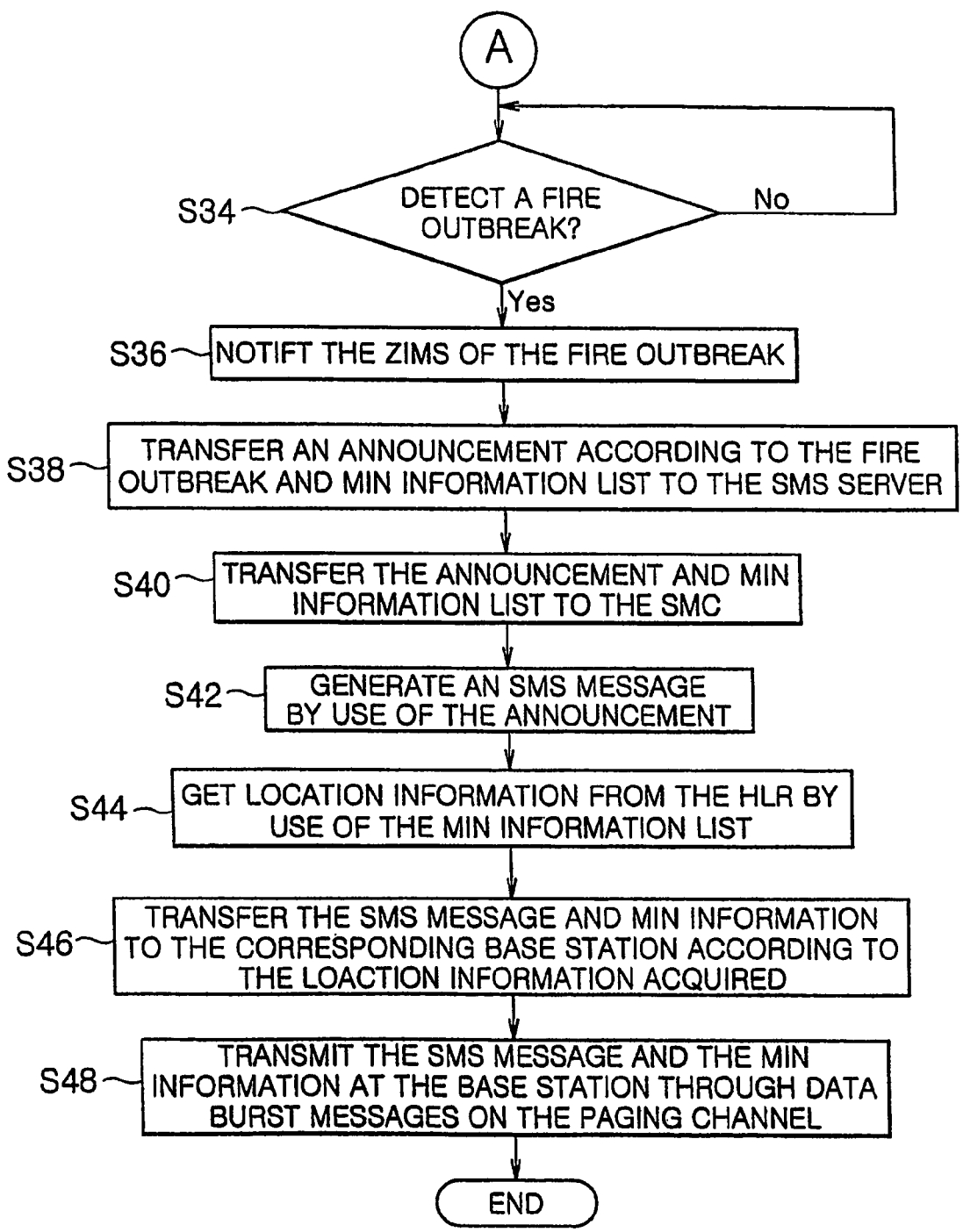

FIG. 25a and FIG. 25b are flowcharts for illustrating a method for providing the Specified Zone-based Personalized Information according to one embodiment of the invention, and will be explained in company with FIG. 1 through FIG. 4.

In the firsts the ZMS (300) located in a specified zone which it supervises acquires the MIN information from the terminal information which is periodically transmitted from the MCT (110) entering the zone to the BTS (S10, S12).

And, it transmits the acquired MIN information and ZII to the ZIMS (240) (S14).

The ZIMS (240) receiving the MIN information and the zone identification information from the ZMS (300) in S14 verifies the mobile communication provider to which the user is subscribed and requests the location registration of the mobile terminal to the HLR (210) that is installed in the mobile communication network of the service provider by transmitting the MIN information and the zone identification information to the HLR (210) (S16, S18).

The HLR (210) performs the location registration according to the MIN information and the Zone Identification Information (ZII) transferred from the ZIMS (240) along with the location registration request.

The ZIMS (240) searches for the information to be transferred to the corresponding user by means of the MIN information transferred from the ZMS (300) through S14, and also searches for the information to be provided to the corresponding zone by means of the zone identification information transferred along with the MIN information (S20).

After that, it transfers the transmission information and the MIN information that are searched to the corresponding SMS server (220) (S22).

The SMS server (220) which receives the information to be transferred to the Mobile Terminal correspond to the MIN information transfers the transmission information transmitted from the ZIMS (240) and the MIN information to the SMC (230), and the SMC (230) receiving the transmission information and the MIN information from the SMS server (220) generates the SMS messages by use of the transmission information transferred from the SMS server (220), gets the location information of the MCT from the HLR (210) according to the MIN information transferred from the SMS server (220) (S24, S26, S28).

And, by use of the location information, it transmits the SMS message to the BTS, where the MCT is located, via the MSC (S30).

The Base Station receiving the SMS message and the MIN information through S30 transmits them to the Mobile Terminal through data burst messages on the paging channel (S32).

When the ZMS (300) detects an entering Mobile Terminal, it transmits the information to be transferred to the Terminal by use of the SMS message. At that time, if the fire detecting part (370) of the Zone Management System (300) detects an outbreak of fire, it notifies the ZIMS (240) of the outbreak of fire (S34, S36).

The ZIMS server (240) notified of the outbreak of fire from the ZMS (300) transfers the MIN information list of the mobile communication terminals, which are located in the zone of the zone management system, and the announcement of the outbreak of fire to the SMS server (220) (S38).

The SMS server (220) receiving the MIN information list and the announcement from the ZIMS (240) transmits them to the SMC (230). The SMC generates the SMS message by use of the announcement of the fire, and gets location information of the mobile terminal corresponding to the MIN information from the HLR according to the MIN information list (S40, S42, S44).

According to the location information acquired in S44, it transfers the SMS message and the MIN information to base station of the cell, where the terminal is located, via the MSC (not depicted) (S46).

The base station receiving the SMS message and the MIN information through S44 transmits them to the mobile terminal through data burst messages on the paging channel (S48).

Meanwhile, the ZIMS (240) notified of the outbreak of fire from the ZMS (300) in S36 transfers the MIN information list of the mobile terminals, which are located in the zone of the other zone management system which is located in the same building where the zone management system notified of the fire alarm is also located, and the announcement of the outbreak of fire to the SMS server (220) in order to notify the mobile terminals in the zone of the other ZMS.

Meanwhile, when the ZMS (300) acquires the MAC (Media Access Control) address instead of the MIN information from the terminal information in Step S12, it transmits the acquired MAC address and the Zone Identification Information to the ZIMS (240). The ZIMS (240) receiving the MAC address and the Zone Identification Information from the ZMS (300) acquires the MIN information matched to the MAC address by searching the MIN information data base by use of the received MAC address. Then, by use of the acquired MIN information, it confirms the Mobile Service Provider that the Mobile Terminal is subscribed to, and requests the location registration of the mobile terminal to the HLR (210) by use of the MIN information and the zone identification information. And after searching for the information to be transferred to the corresponding user by use of the MIN information searched from the MIN information database and searching for the information to be provided to the corresponding zone by use of the zone identification information, it transfers the transmission information and the MIN information searched to the corresponding SMS server (220).

Figure 26A:
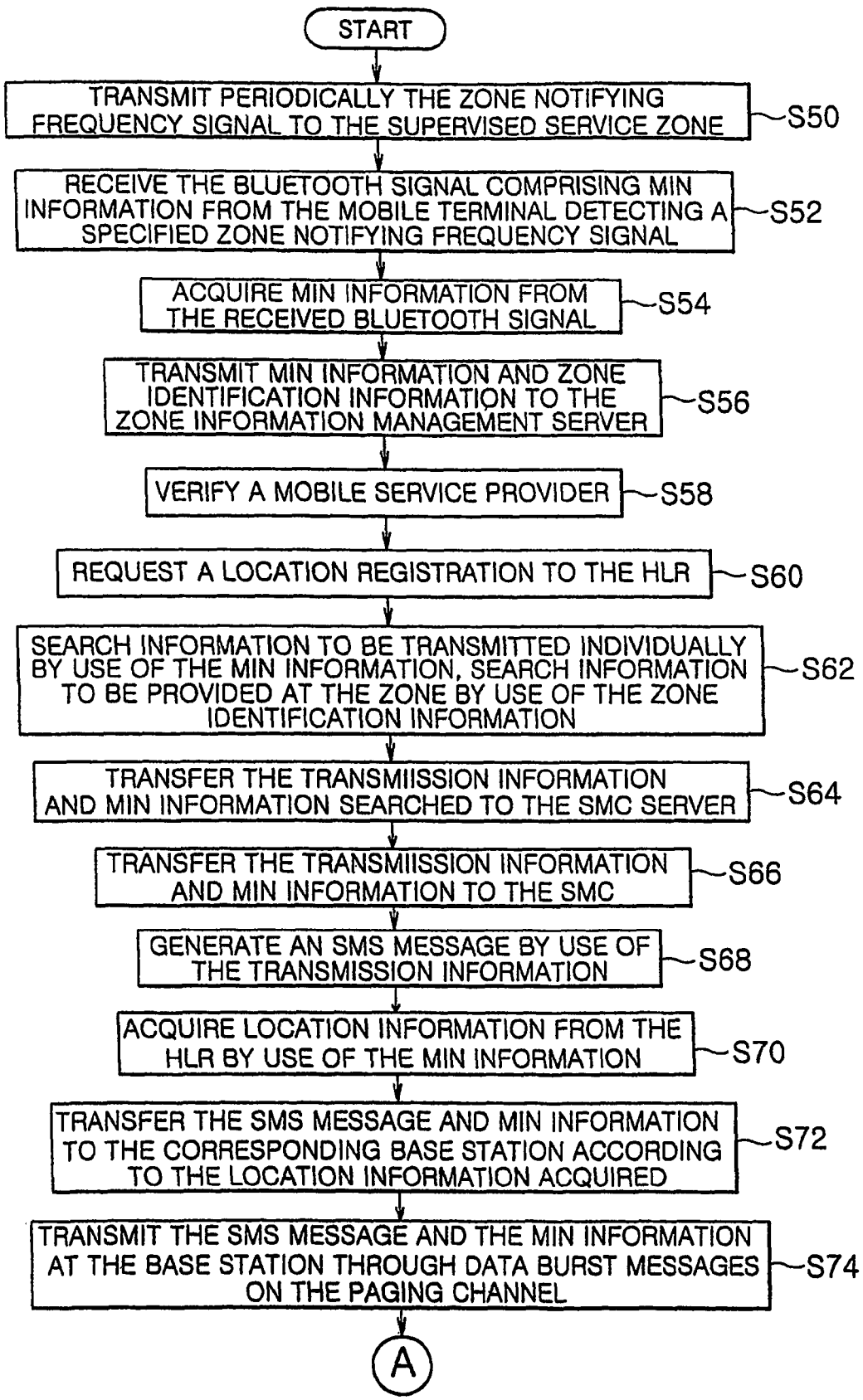
FIG. 26a and FIG. 26b are flowcharts for illustrating a method for providing a zone-based personalized information according to another embodiment of the invention.
Figure 26B:
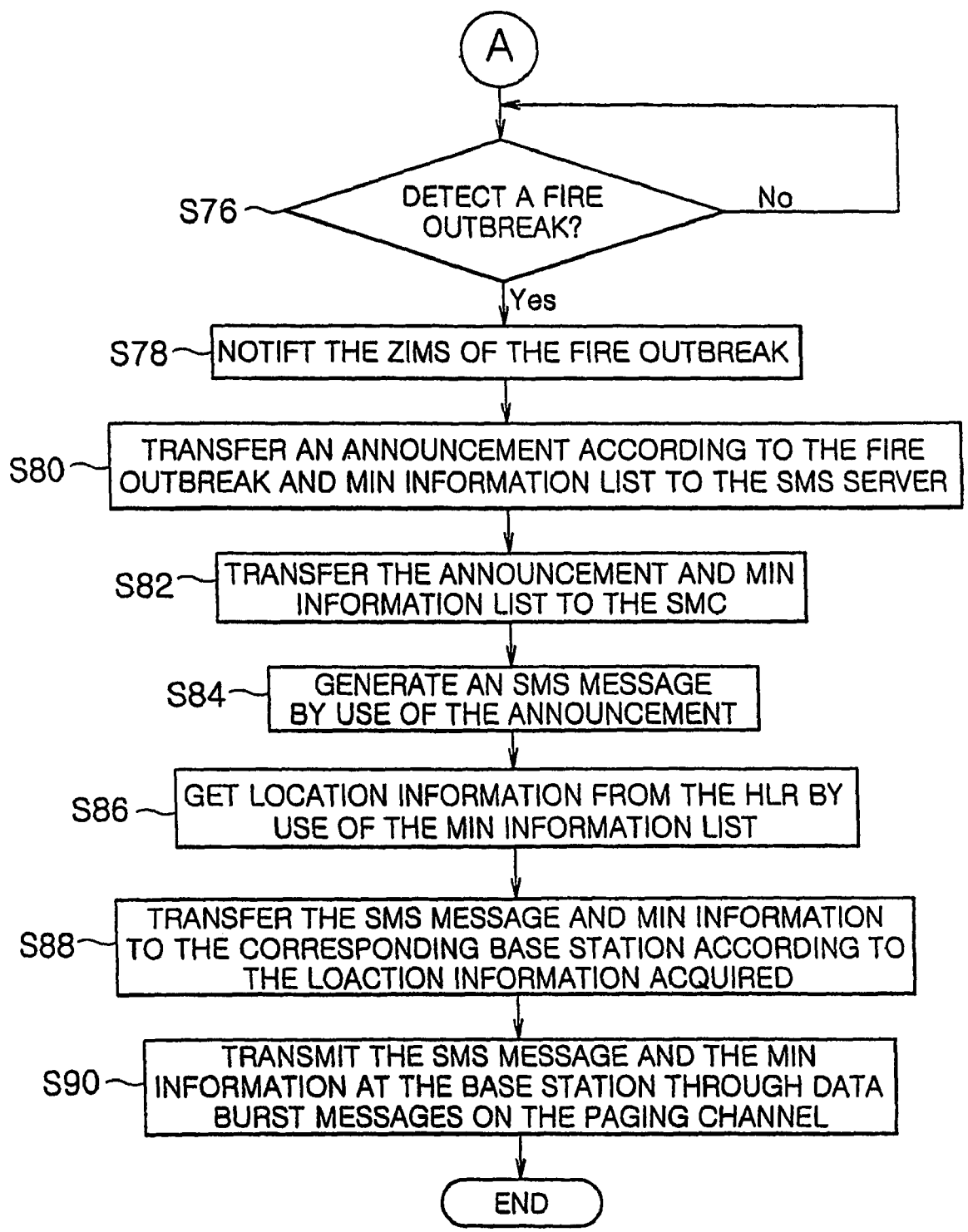

FIG. 26a and FIG. 26b are flowcharts for illustrating a method for providing the Specified Zone-based Personalized Information according to another embodiment of the invention, will be explained in company with FIG. 5 through FIG. 8.

At first, the ZMS (400) periodically transmits the specific zone notifying frequency signal to the corresponding zone (S50). The mobile terminal (120) which detects the specific zone notifying frequency signal activates the operating mode of the Blue tooth chip, and transmits its own MIN information to the ZMS (400) through Bluetooth signal.

The ZMS (400) receiving the Bluetooth signal transmitted from the Mobile terminal (120) acquires the MIN information from the Bluetooth signal (S52, S54), and transmits the acquired MIN information and the ZII to the ZIMS (240) (S56).

The ZIMS (240) receiving the MIN information and the zone identification information from the ZMS (400) in S56 verifies the mobile communication provider to which the user is subscribed according to the MIN information, and requests the location registration of the mobile terminal to the HLR (210) that is installed in the mobile communication network of the service provider by transmitting the MIN information and the zone identification information (S58, S60).

The HLR (210) to which location registration is requested in S60 performs the location registration according to the MIN information and the Zone Identification Information (ZII) transferred along with the location registration request.

The ZIMS (240) searches for the information to be transferred to the corresponding user by means of the MIN information transferred from the ZMS (300) through S56, and also searches for the information to be provided to the corresponding zone by means of the zone identification information transferred along with the MIN information (S62).

After that, it transfers the transmission information and the MIN information searched to the corresponding SMS server (220) (S64).

The SMS server (220) which receives the information to be transferred to the Mobile Terminal corresponding to the MIN information through S64 transfers the transmission information and the MIN information to the SMC (230). The SMC (230) receiving the transmission information and the MIN information from the SMS server (220) generates the SMS messages by use of the transmission information transferred from the SMS server (220), and gets the location information of the MCT from the HLR (210) according to the MIN information transferred from the SMS server (220) (S66, S68, S70).

After that, by use of the location information acquired in S70, it transmits the SMS message and MIN information to the BTS, where the MCT is located, via the MSC (not depicted) (S72).

The Base Station receiving the SMS message and the MIN information through S72 transmits them to the Mobile Terminal through data burst messages on the paging channel (S74).

As said previously, when the ZMS (400) detects an entering Mobile Terminal, it transmits the information to be transferred to the Terminal by use of the SMS message. At that time, if the fire detecting part (470) of the Zone Management System (400) detects the outbreak of fire, it notifies the ZIMS (240) of that (S76, S78).

The ZIMS server (240) notified of the outbreak of fire from the ZMS (400) in S78 transfers the MIN information list of the mobile communication terminals, which are located in the zone of the zone management system, and the announcement of the outbreak of fire to the SMS server (220) (S80).

The SMS server (220) receiving the MIN information list and the announcement from the ZIMS (240) in S80 transmits them to the SMC (230). The SMC generates the SMS message by use of the announcement of the fire, and gets location information of the mobile terminal corresponding to the MIN information from the HLR according to the MIN information list (S82, S84, S86).

According to the location information acquired in S86, it transfers the SMS message and the MIN information to base station of the cell, where the terminal is located, via the MSC (not depicted) (S88).

The Base Station receiving the Transmission Information and the MIN information through S88 transmits them to the Mobile Terminal through data burst messages on the paging channel (S90).

Meanwhile, the Step 50 through. Step 52 can be replaced with the step that the ZMS (400) requests location registration to the Mobile Terminal entering a specified zone by use of the location registration requesting message, and receives the Bluetooth signal including the MIN information from the Mobile Terminal (120) to which location registration is requested.

Meanwhile, when the mobile terminal (120) transmits the MAC address instead of the MIN information through Bluetooth signal, the ZMS (400) receiving the Bluetooth signal acquires the MAC address from the received Bluetooth signal, and transmits the acquired the MAC address and the Zone Identification Information to the ZIMS (240). And the ZIMS (240) receiving the MAC address and the Zone Identification Information from the ZMS (400) acquires the MIN information matched to the MAC address by searching the MIN information data base by use of the received MAC address. Then, by use of the acquired MIN information, it confirms the Mobile Service Provider the Mobile Terminal is subscribed to, and requests the location registration of the mobile terminal to the HLR (210) by use of the MIN information and the zone identification information. And after searching for the information to be transferred to the corresponding user by use of the MIN information searched from the MIN information database and searching for the information to be provided to the corresponding zone by use of the zone identification information, it transfers the transmission information and the MIN information searched to the corresponding SMS server (220).

Figure 27A:
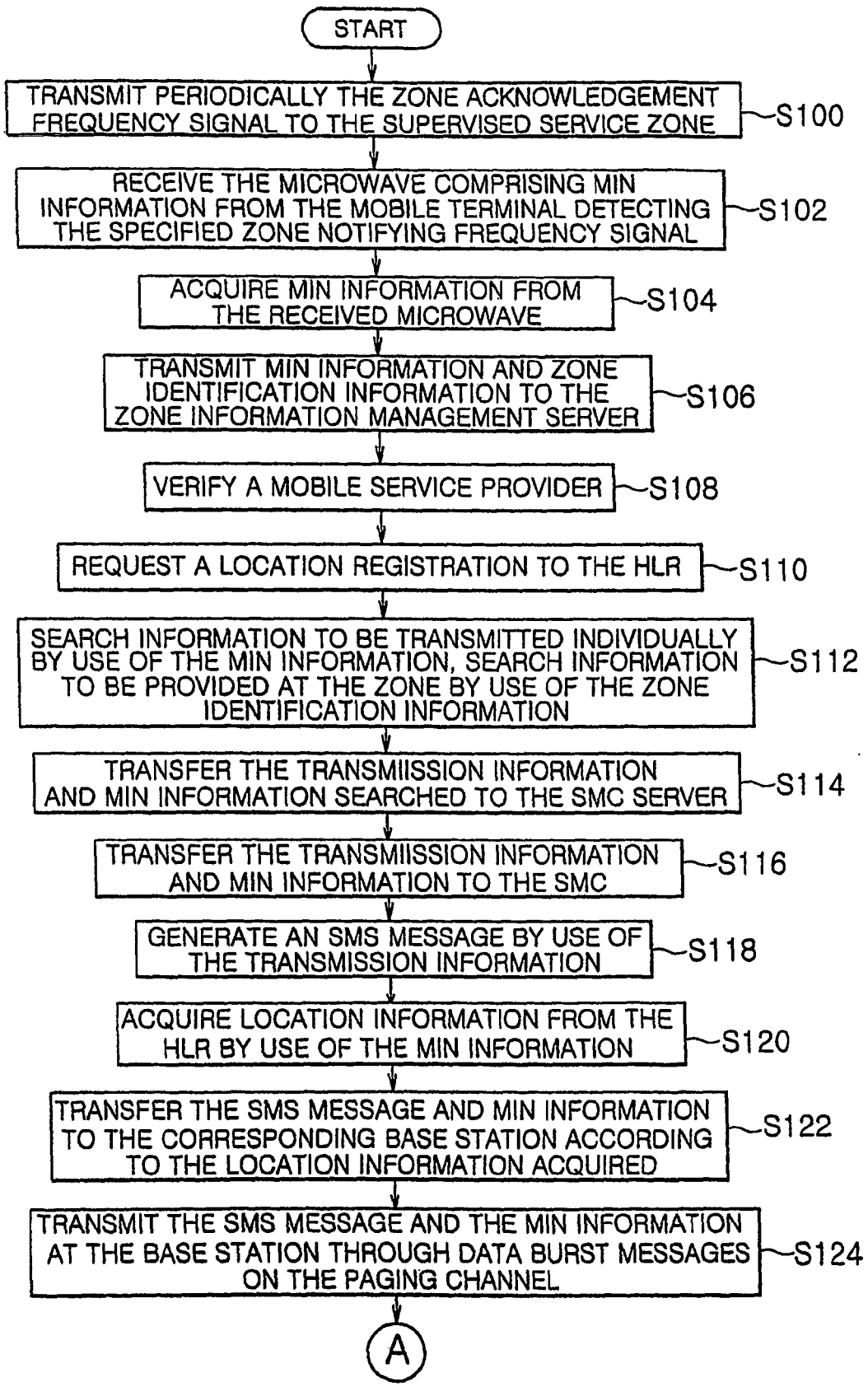
FIG. 27a and FIG. 27b are flowcharts for illustrating a method for providing a zone-based personalized information according to yet another embodiment of the invention.
Figure 27B:
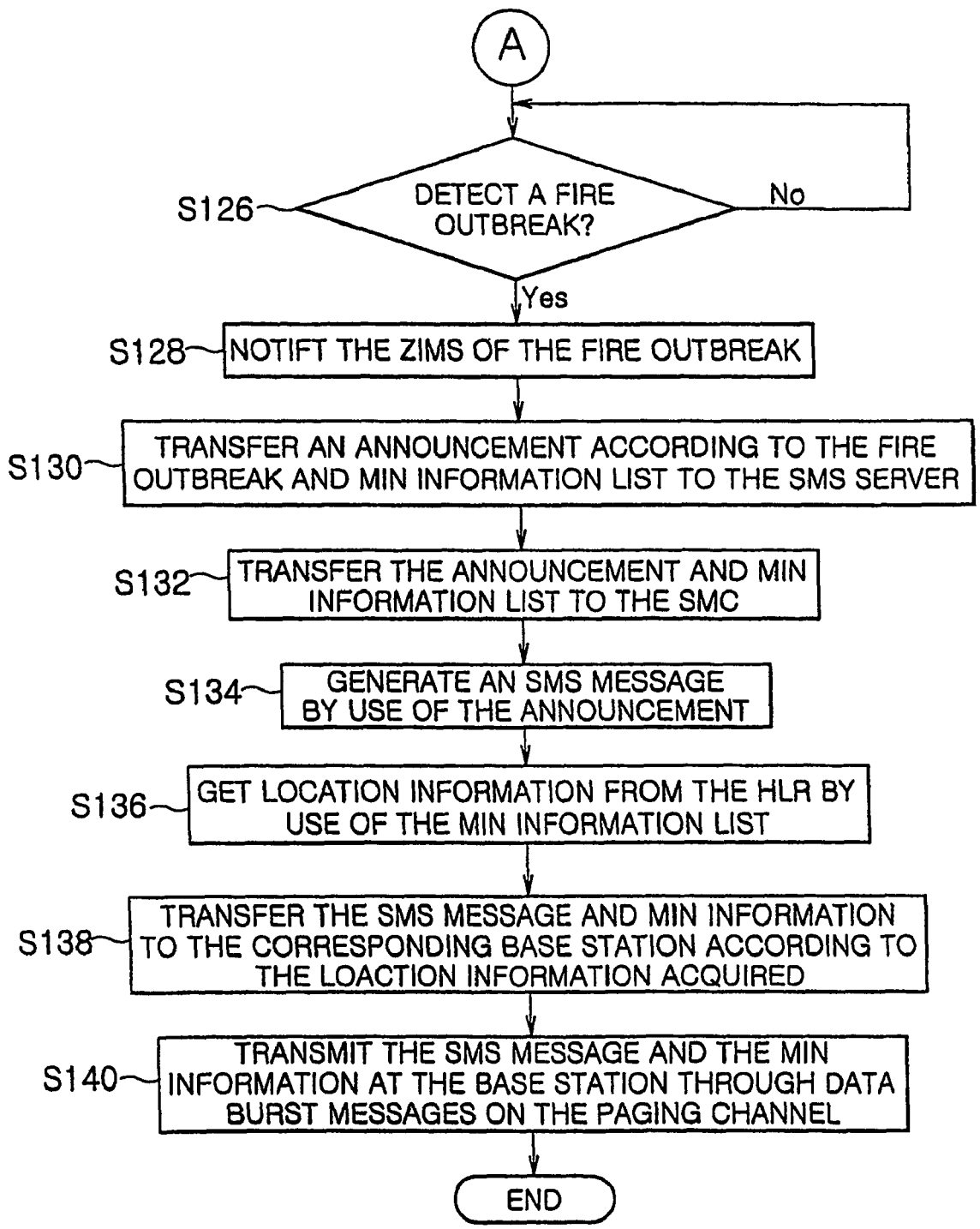

FIG. 27a and FIG. 27b are flowcharts for illustrating a method for providing the Specified Zone-based Personalized Information according to yet another embodiment of the invention, will be explained in company with FIG. 9 through FIG. 12.

At first, the ZMS (500) periodically transmits the specific zone notifying frequency signal to the corresponding zone (100). The mobile terminal (130) which detects the specific zone notifying frequency signal activates the operating mode of the WLAN chip, and transmits its own MIN information to the ZMS (500) through microwave for WLAN of 2.4 GHz band.

The ZMS (500) receiving the microwave signal transmitted from the Mobile terminal (130) acquires the MIN information from microwave signal (S102, S104), and transmits the acquired MIN information and the ZII to the ZIMS (240) (S106).

The ZIMS (240) receiving the MIN information and the zone identification information from the ZMS (400) in S56 verifies the mobile communication provider to which the user is subscribed according to the MIN information, and requests the location registration of the mobile terminal to the HLR (210) that is installed in the mobile communication network of the service provider by transmitting the MIN information and the zone identification information (S108, S110).

The HLR (210) to which location registration is requested in S110 performs the location registration according to the MIN information and the Zone Identification Information (ZII) transferred along with the location registration request.

The ZIMS (240) searches for the information to be transferred to the corresponding user by means of the MIN information transferred from the ZMS (500) through S106, and also searches for the information to be provided to the corresponding zone by means of the zone identification information transferred along with the MIN information (S112).

After that, it transfers the transmission information and the MIN information searched to the corresponding SMS server (220) (S114).

The SMS server (220) which receives the information to be transferred to the Mobile Terminal correspond to the MIN information through S114 transfers the transmission information and the MIN information to the SMC (230). The SMC (230) receiving the transmission information and the MIN information from the SMS server (220) generates the SMS messages by use of the transmission information transferred from the SMS server (220), and gets the location information of the MCT from the HLR (210) according to the MIN information transferred from the SMS server (220) (S116, S118, S120).

After that, by use of the location information in S120, it transmits the SMS message and the MIN information to the BTS, where the MCT is located, via the MSC (not depicted) (S122).

The Base Station receiving the SMS message and the MIN information through S122 transmits them to the Mobile Terminal through data burst messages on the paging channel (S124).

As said previously, when the ZMS (500) detects an entering Mobile Terminal, it transmits the information to be transferred to the Terminal by use of the SMS message. At that time, if the fire detection part (570) of the Zone Management System (500) detects an outbreak of fire, it notifies the ZIMS (240) of that (S126, S128).

The ZIMS server (240) notified of the outbreak of fire from the ZMS (500) in S128 transfers the MIN information list of the mobile communication terminals, which are located in the zone of the zone management system, and the announcement of the outbreak of fire to the SMS server (220) (S130).

The SMS server (220) receiving the MIN information list and the announcement from the ZIMS (240) in S130 transmits them to the SMC (230). The SMC generates the SMS message by use of the announcement of the fire, and gets location information of the mobile terminal corresponding to the MIN information from the HLR according to the MIN information (S132, S134, S136).

According to the location information acquired in S136, it transfers the SMS message and the MIN information to base station of the cell, where the terminal is located, via the MSC (not depicted) (S138).

The Base Station receiving the Transmission Information and the MIN information through S138 transmits them to the Mobile Terminal through data burst messages on the paging channel (S140).

Meanwhile, the Step 100 through Step 102 can be replaced with the step that the ZMS (500) requests location registration to the Mobile Terminal entering a specified zone by use of the location registration requesting message, and receives the microwave signal including the MIN information from the Mobile Terminal (130) to which location registration is requested.

Meanwhile, when the mobile terminal (130) transmits the MAC address instead of the MIN information through microwave, the ZMS (500) receiving the microwave acquires the MAC address from the received microwave, and transmits the acquired the MAC address and the Zone Identification Information to the ZIMS (240). And the ZIMS (240) receiving the MAC address and the Zone Identification Information from the ZMS (500) acquires the MIN information matched to the MAC address by searching the MIN information data base by use of the received MAC address. Then, by use of the acquired MIN information, it confirms the Mobile Service Provider the Mobile Terminal is subscribed to, and requests the location registration of the mobile terminal to the HLR (210) by use of the MIN information and the zone identification information. And after searching for the information to be transferred to the corresponding user by use of the MIN information and searching for the information to be provided to the corresponding zone by use of the zone identification information, it transfers the transmission information and the MIN information searched to the corresponding SMS server (220).

Figure 28A:
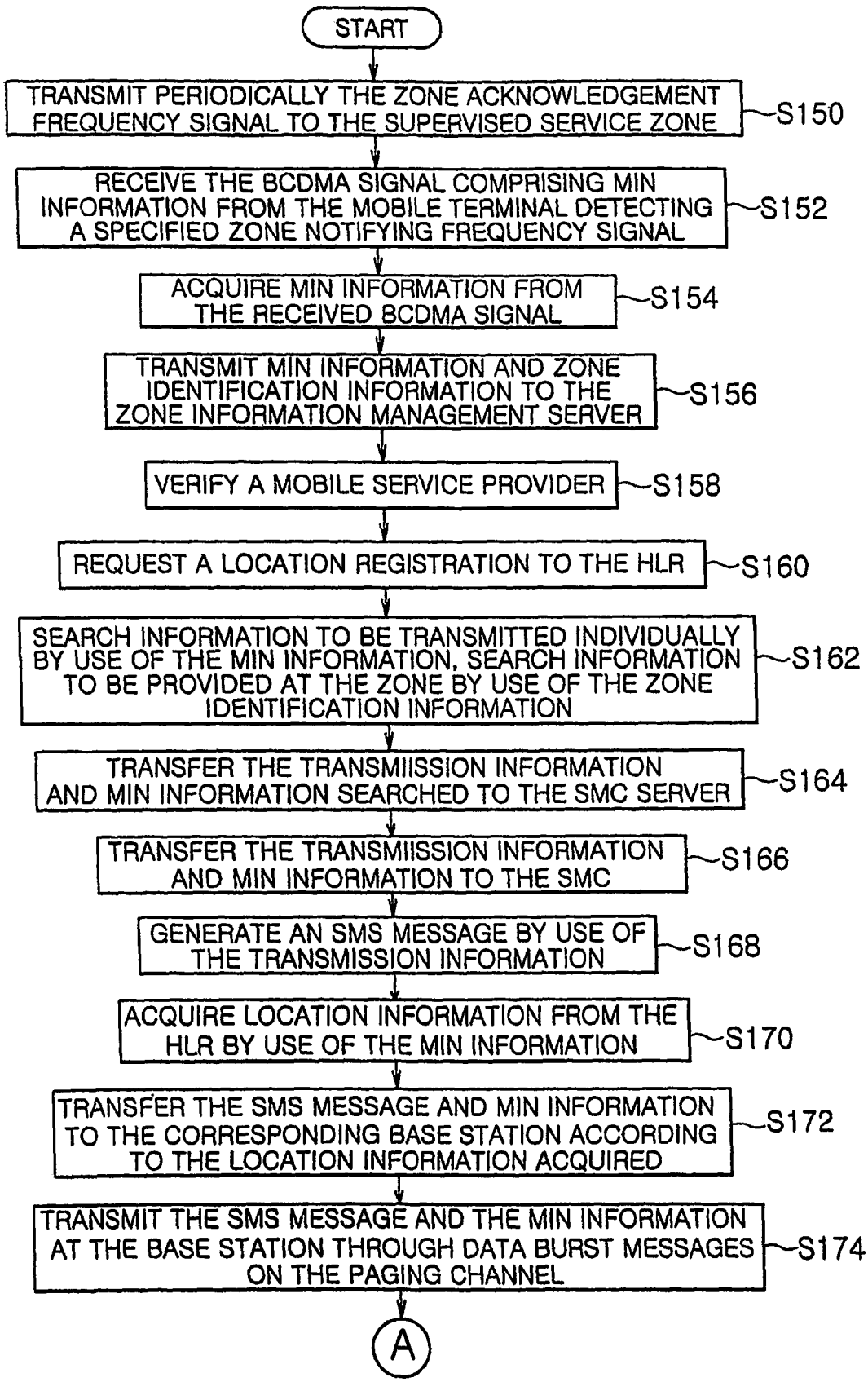
FIG. 28a and FIG. 28b are flowcharts for illustrating a method for providing a zone-based personalized information according to still another embodiment of the invention.
Figure 28B:
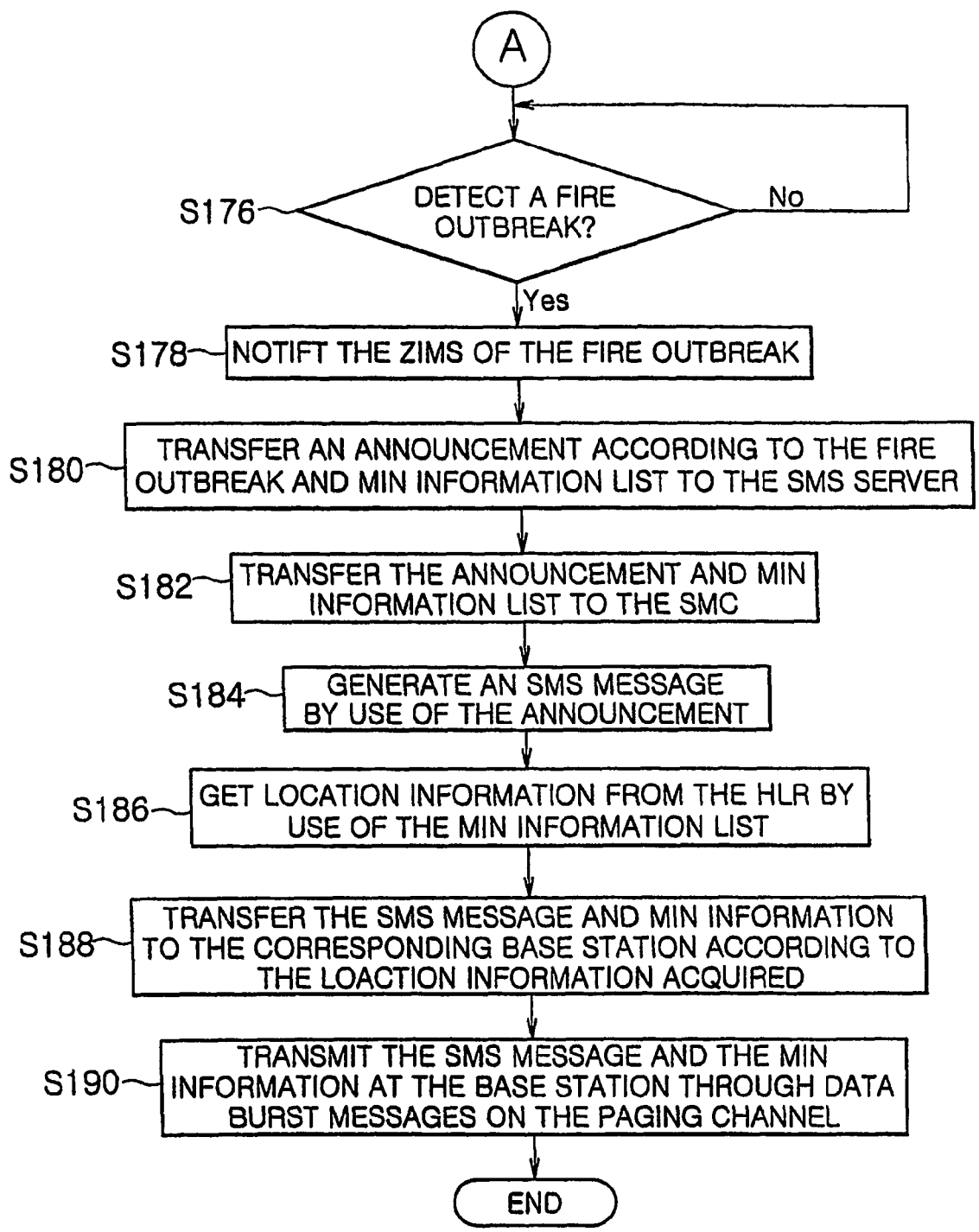

FIG. 28a and FIG. 28b are flowcharts for illustrating a method for providing the Specified Zone-based Personalized Information according to still another embodiment of the invention, will be explained in company with FIG. 13 through FIG. 16.

At first, the ZMS (600) periodically transmits the specific zone notifying frequency signal to the corresponding zone (S150). The mobile terminal (140) which detects the specific zone notifying frequency signal activates the operating mode of the BCDMA chip, and transmits its own MIN information to the ZMS (600) through BCDMA signal.

The ZMS (600) receiving the BCDMA signal transmitted from the Mobile terminal (140) acquires the MIN information from the BCDMA signal (S152, S154), and transmits the acquired MIN information and the ZII to the ZIMS (240) (S156).

The ZIMS (240) receiving the MIN information and the zone identification information from the ZMS (600) in S156 verifies the mobile communication provider to which the user is subscribed according to the MIN information, and requests the location registration of the mobile terminal to the HLR (210) that is installed in the mobile communication network of the service provider by transmitting the MIN information and the zone identification information (S158, S160).

The HLR (210) to which location registration is requested in S160 performs the location registration according to the MIN information and the Zone Identification Information (ZII) transferred along with the location registration request.

The ZIMS (240) searches for the information to be transferred to the corresponding user by means of the MIN information transferred from the ZMS (600) through S156, and also searches for the information to be provided to the corresponding zone by means of the zone identification information transferred along with the MIN information (S162).

After that, it transfers the transmission information and the MIN information searched to the corresponding SMS server (220) (S164).

The SMS server (220) which receives the information to be transferred to the Mobile Terminal correspond to the MIN information through S164 transfers the transmission information and the MIN information to the SMC (230). The SMC (230) receiving the transmission information and the MIN information from the SMS server (220) generates the SMS messages by use of the transmission information transferred from the SMS server (220), and gets the location information of the MCT from the HLR (210) according to the MIN information transferred from the SMS server (220) (S166, S168, S170).

After that, by use of the location information in S170, it transmits the SMS message and the MIN information to the BTS, where the MCT is located, via the MSC (not depicted) (S172).

The Base Station receiving the SMS message and the MIN information through S172 transmits them to the Mobile Terminal through data burst messages on the paging channel (S174).

As said previously, when the ZMS (600) detects an entering Mobile Terminal, it transmits the information to be transferred to the Terminal by use of the SMS message. At that time, if the fire detecting part (670) of the Zone Management System (600) detects an outbreak of fire, it notifies the ZIMS (240) of that (S176, S178).

The ZIMS server (240) notified of the outbreak of fire from the ZMS (600) in S178 transfers the MIN information list of the mobile communication terminals, which are located in the zone of the zone management system, and the announcement of the outbreak of fire to the SMS server (220) (S180).

The SMS server (220) receiving the MIN information list and the announcement from the ZIMS (240) in S180 transmits them to the SMC (230). The SMC generates the SMS message by use of the announcement of the fire, and gets location information of the mobile terminal from the HLR according to the MIN information (S182, S184, S186).

According to the location information acquired in S186, it transfers the SMS message and the MIN information to base station of the cell, where the terminal is located, via the MSC (not depicted) (S188).

The Base Nation receiving the Transmission Information and the MIN information through S188 transmits them to the Mobile Terminal through data burst messages on the paging channel (S190).

Meanwhile, the Step 150 through Step 152 can be replaced with the step that the ZMS (600) requests location registration to the Mobile Terminal entering a specified zone by use of the location registration requesting message, and receives the BCDMA signal including the MIN information from the Mobile Terminal (140) requested location registration.

Meanwhile, when the mobile terminal (140) transmits the MAC address instead of the MIN information through BCDMA signal, the ZMS (600) receiving the BCDMA signal acquires the MAC address from the received the BCDMA signal, and transmits the acquired the MAC address and the Zone Identification Information to the ZIMS (240). And the ZIMS (240) receiving the MAC address and the Zone Identification Information from the ZMS (600) acquires the MIN information matched to the MAC address by searching the MIN information data base by use of the received MAC address. Then, by use of the acquired MIN information, it confirms the Mobile Service Provider the Mobile Terminal is subscribed to, and requests the location registration of the mobile terminal to the HLR (210) by use of the MIN information and the zone identification information. And after searching for the information to be transferred to the corresponding user by use of the MIN information and searching for the information to be provided to the corresponding zone by use of the zone identification information, it transfers the transmission information and the MIN information searched to the corresponding SMS server (220).

Figure 29A:
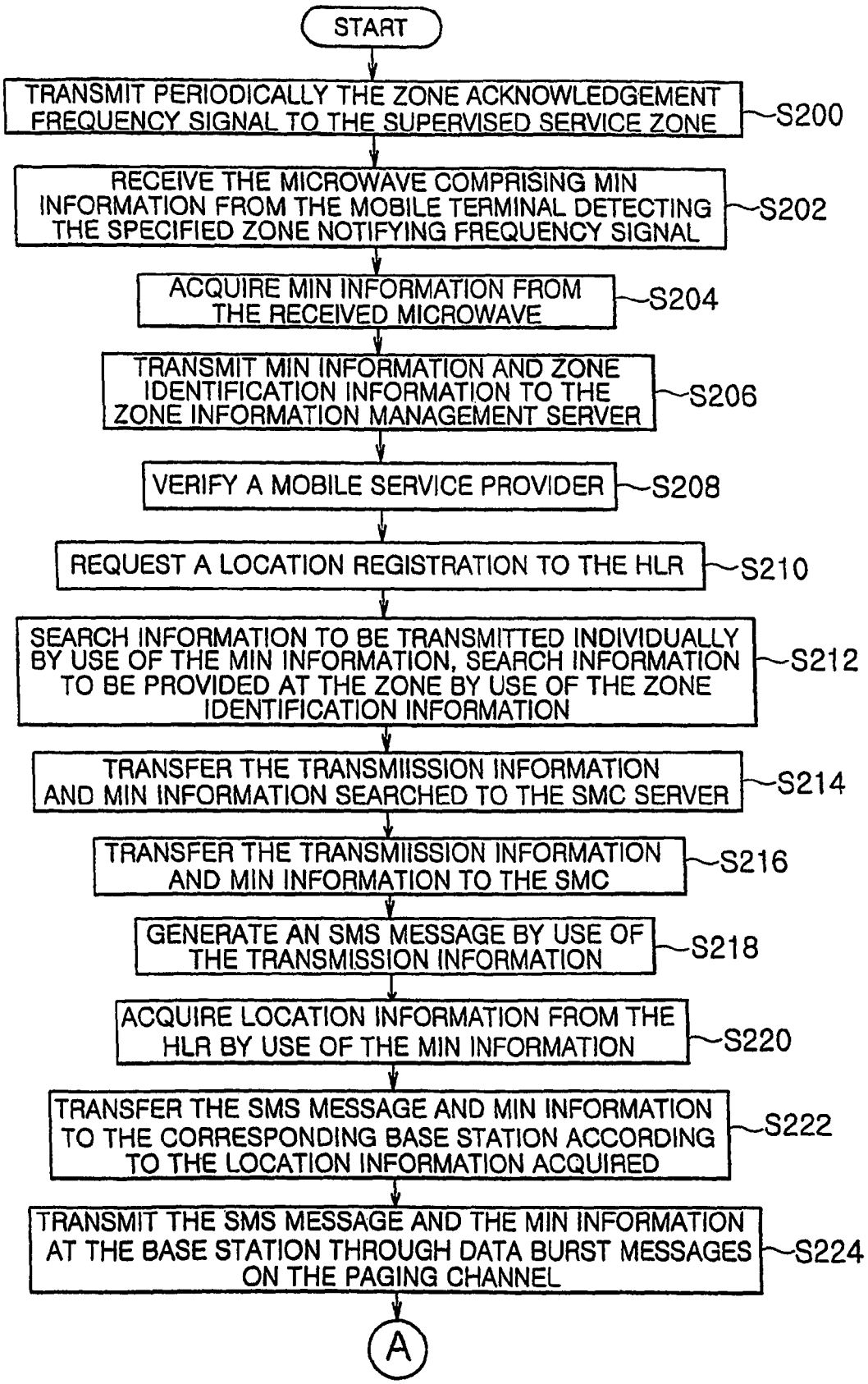
FIG. 29a and FIG. 29b are flowcharts for illustrating a method for providing a zone-based personalized information according to still another embodiment of the invention.
Figure 29B:
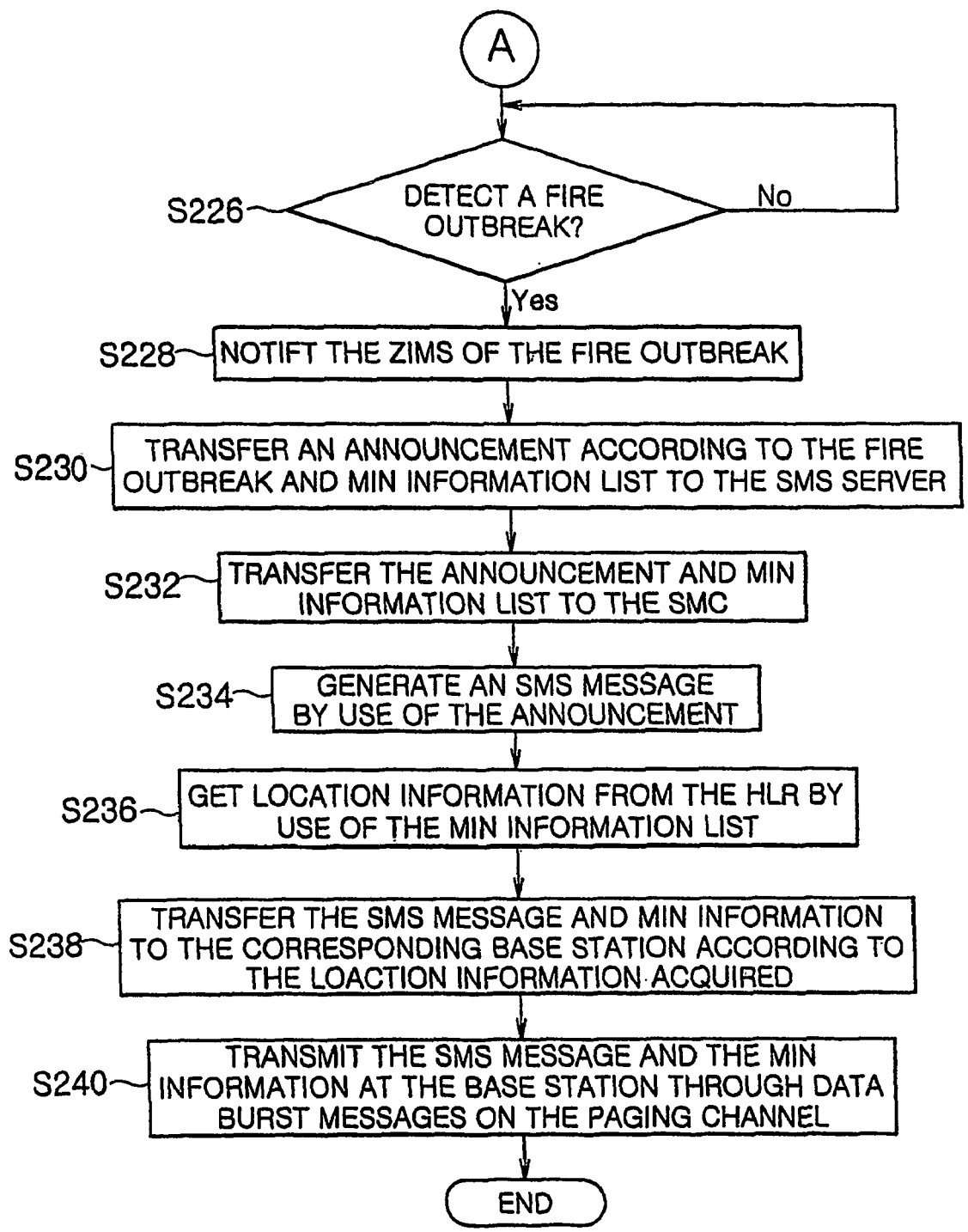

FIG. 29a and FIG. 29b are flowcharts for illustrating a method for providing the Specified Zone-based Personalized Information according to still another embodiment of the invention, will be explained in company with FIG. 17 through FIG. 20.

At first, the ZMS (700) periodically transmits the specific zone notifying frequency signal to the corresponding zone (S200). The mobile terminal (150) which detects the specific zone notifying frequency signal activates the operating mode of the ZigBee chip, and transmits its own MIN information to the ZMS (700) through microwave of 2.4 GHz band/915 MHz band/868 MHz band for ZigBee.

The ZMS (700) receiving the microwave signal transmitted from the Mobile terminal (150) acquires the MIN information from microwave signal (S202, S204), and transmits the acquired MIN information and the ZII to the ZIMS (240) (S206).

The ZIMS (240) receiving the MIN information and the zone identification information from the ZMS (700) in S206 verifies the mobile communication provider to which the user is subscribed according to the MIN information, and requests the location registration of the mobile terminal to the HLR (210) that is installed in the mobile communication network of the service provider by transmitting the MIN information and the zone identification information (S208, S210).

The HLR (210) to which location registration is requested in S210 performs the location registration according to the MIN information and the Zone Identification Information (the ZII) transferred along with the location registration request.

The ZIMS (240) searches for the information to be transferred to the corresponding user by means of the MIN information transferred from the ZMS (700) through S206, and also searches for the information to be provided to the corresponding zone by means of the zone identification information transferred along with the MIN information (S212).

After that, it transfers the transmission information and the MIN information searched to the corresponding SMS server (220) (S214).

The SMS server (220) which receives the information to be transferred to the Mobile Terminal correspond to the MIN information through S214 transfers the transmission information and the MIN information to the SMC (230). The SMC (230) receiving the transmission information and the MIN information from the SMS server (220) generates the SMS messages by use of the transmission information transferred from the SMS server (220), and gets the location information of the MCT from the HLR (210) according to the MIN information transferred from the SMS server (220) (S216, S218, S220).

After that, by use of the location information in S220, it transmits the SMS message and the MIN information to the BTS, where the MCT is located, via the MSC (not depicted) (S222).

The Base Station receiving the SMS message and the MIN information through S222 transmits them to the Mobile Terminal through data burst messages on the paging channel (S224).

As said previously, when the ZMS (700) detects an entering Mobile Terminal, it transmits the information to be transferred to the Terminal by use of the SMS message. At that time, if the fire detecting part (770) of the Zone Management System detects an outbreak of fire, it notifies the ZIMS (240) of that (S226, S228).

The ZIMS server (240) acknowledged the outbreak of fire from the ZMS (700) in S228 transfers the MIN information list of the mobile communication terminals, which are located in the zone of the zone management system, and the announcement of the outbreak of fire to the SMS server (220) (S230).

The SMS server (220) receiving the MIN information list and the announcement from the ZIMS (240) in S230 transmits them to the SMC (230). The SMC generates the SMS message by use of the announcement of the fire, and gets location information of the mobile terminal from the HLR (S232, S234, S236) according to the MIN information.

According to the location information acquired in S236, it transfers the SMS message and the MIN information to base station of the cell, where the terminal is located, via the MSC (not depicted) (S238).

The Base Station receiving the Transmission Information and the MIN information through S238 transmits them to the Mobile Terminal through data burst messages on the paging channel (S240).

Meanwhile, the Step 200 through Step 202 can be replaced with the step that the ZMS (700) requests location registration to the Mobile Terminal entering a specified zone by use of the location registration requesting message, and receives the microwave signal including the MIN information from the Mobile Terminal (150) requested location registration.

Meanwhile, when the mobile terminal (150) transmits the MAC address instead of the MIN information through microwave, the ZMS (700) receiving the microwave acquires the MAC address from the received microwave, and transmits the acquired the MAC address and the Zone Identification Information to the ZIMS (240). And the ZIMS (240) receiving the MAC address and the Zone Identification Information from the ZMS (700) acquires the MIN information matched to the MAC address by searching the MIN information data base by use of the received MAC address. Then, by use of the acquired MIN information, it confirms the Mobile Service Provider the Mobile Terminal is subscribed to, and requests the location registration of the mobile terminal to the HLR (210) by use of the MIN information and the zone identification information. And after searching for the information to be transferred to the corresponding user by use of the MIN information and searching for the information to be provided to the corresponding zone by use of the zone identification information, it transfers the transmission information and the MIN information searched to the corresponding SMS server (220).

Figure 30A:
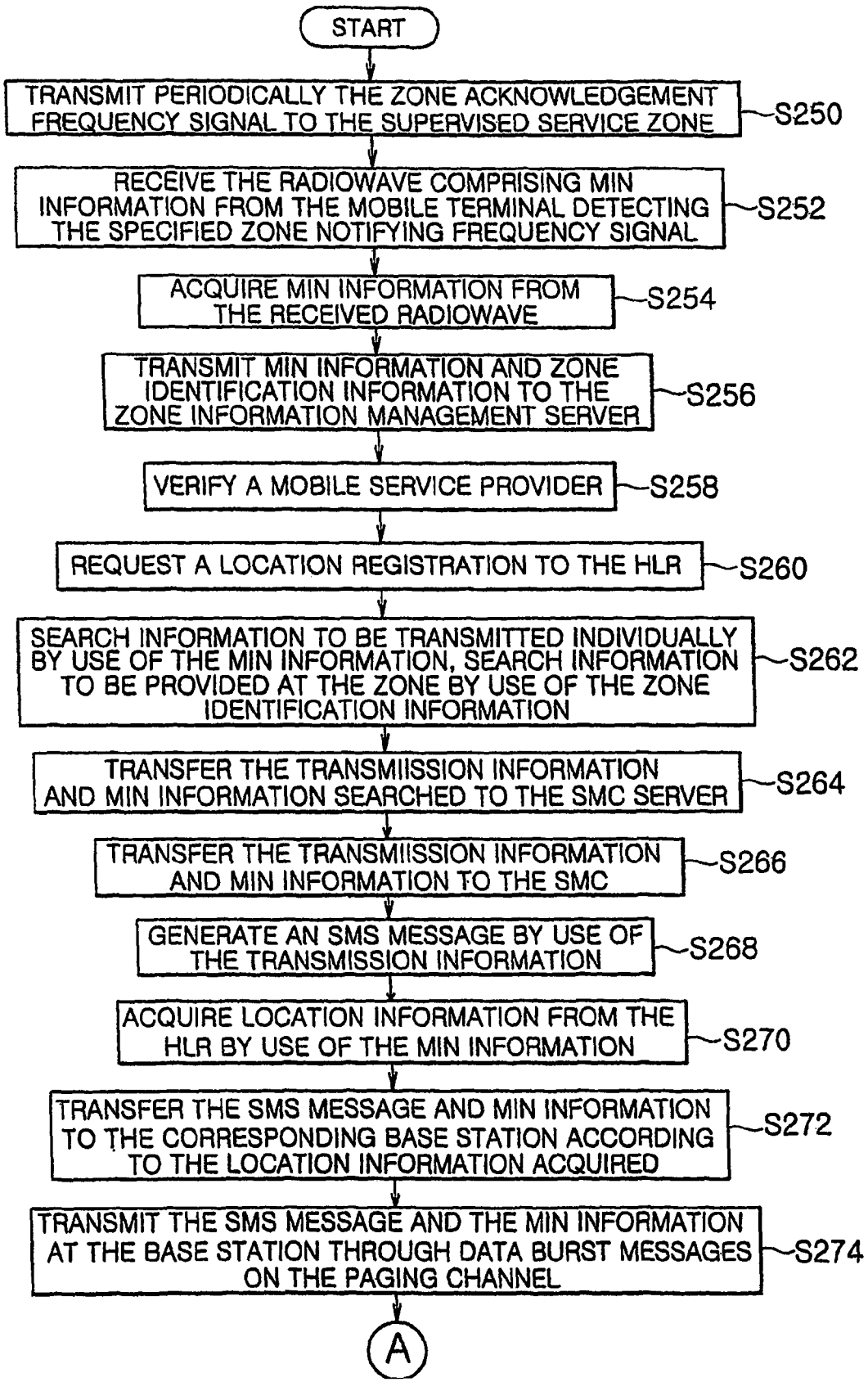
FIG. 30a and FIG. 30b are flowcharts for illustrating a method for providing a zone-based personalized information according to still another embodiment of the invention.
Figure 30B:
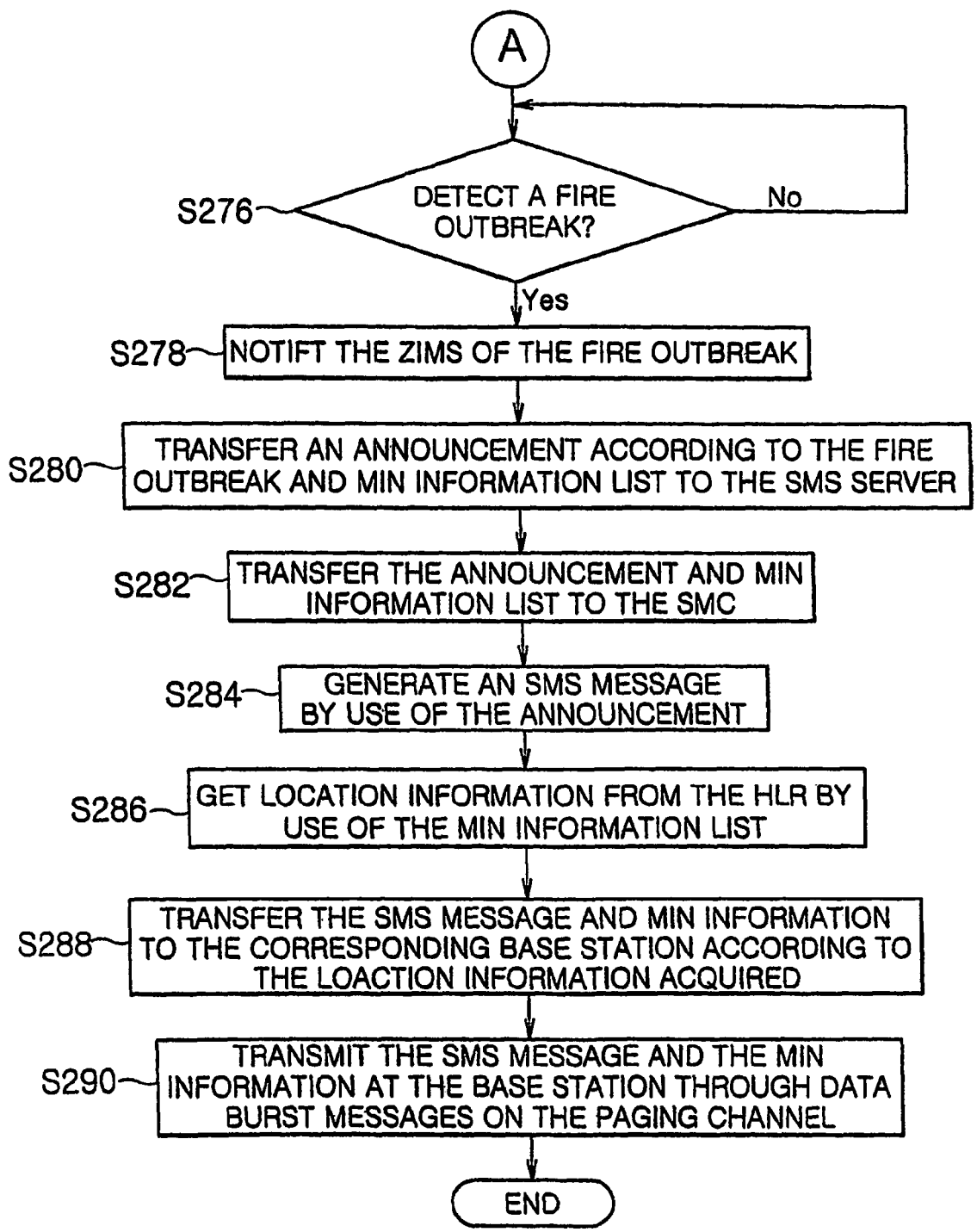

FIG. 30a and FIG. 30b are flowcharts for illustrating a method for providing the Specified Zone-based Personalized Information according to still another embodiment of the invention, will be explained in company with FIG. 21 through FIG. 24.

At first, the ZMS (800) periodically transmits the specific zone notifying frequency signal to the corresponding zone (S250), the mobile terminal (160) which detects the specific zone notifying frequency signal activates the operating mode of the RFID chip, and transmits its own MIN information to the ZMS (800) through radio wave.

The ZMS (800) receiving the radio wave signal transmitted from the Mobile terminal (160) acquires the MIN information from radio wave (S252, S254), and transmits the acquired MIN information and the ZII to the ZIMS (240) (S256).

The ZIMS (240) receiving the MIN information and the zone identification information from the ZMS (800) in S256 verifies the mobile communication provider to which the user is subscribed according to the MIN information, and requests the location registration of the mobile terminal to the HLR (210) that is installed in the mobile communication network of the service provider by transmitting the MIN information and the zone identification information (S258, S260).

The HLR (210) to which location registration is requested in S260 performs the location registration according to the MIN information and the Zone Identification Information (the ZII) transferred along with the location registration request.

The ZIMS (240) searches for the information to be transferred to the corresponding user by means of the MIN information transferred from the ZMS (800) through S256, and also searches for the information to be provided to the corresponding zone by means of the zone identification information transferred along with the MIN information (S262).

After that, it transfers the transmission information and the MIN information that are searched to the corresponding SMS server (220) (S264).

The SMS server (220) which receives the information to be transferred to the Mobile Terminal correspond to the MIN information through S264 transfers the transmission information transmitted from the ZIMS (240) and the MIN information to the SMC (230). The SMC (230) receiving the transmission information and the MIN information from the SMS server (220) generates the SMS messages by use of the transmission information transferred from the SMS server (220), and gets the location information of the MCT from the HLR (210) according to the MIN information transferred from the SMS server (220) (S266, S268, S270).

After that, by use of the location information in S270, it transmits the SMS message and the MIN information to the BTS, where the MCT is located, via the MSC (not depicted) (S272).

The Base Station receiving the SMS message and the MIN information through S272 transmits them to the Mobile Terminal through data burst messages on the paging channel (S274).

As said previously, when the ZMS (800) detects an entering Mobile Terminal, it transmits the information to be transferred to the Terminal by use of the SMS message. At that time, if the fire detecting part (870) of the Zone Management System (800) detects an outbreak of fire, it notifies the ZIMS (240) of that (S276, S278).

The ZIMS server (240) notified of the outbreak of fire from the ZMS (800) in S278 transfers the MIN information list of the mobile communication terminals, which are located in the zone of the zone management system, and the announcement of the outbreak of fire to the SMS server (220) (S280).

The SMS server (220) receiving the MIN information list and the announcement from the ZIMS (240) in S280 transmits them to the SMC (230). The SMC generates the SMS message by use of the announcement of the fire, and gets location information of the mobile terminal according to the MIN information from the HLR (S282, S284, S286).

According to the location information acquired in S286, it transfers the SMS message and the MIN information to base station of the cell, where the terminal is located, via the MSC (not depicted) (S288).

The Base Station receiving the Transmission Information and the MIN information through S288 transmits them to the Mobile Terminal through data burst messages on the paging channel (S290).

Meanwhile, the Step 250 through Step 252 can be replaced with the step that the ZMS (800) requests location registration to the Mobile Terminal entering a specified zone by use of the location registration requesting message, and receives the radio wave signal including the MIN information from the Mobile Terminal (160) requested location registration.

Meanwhile, when the mobile terminal (160) transmits the MAC address instead of the MIN information through radio wave, the ZMS (800) receiving the radio wave acquires the MAC address from the received the radio wave, and transmits the acquired the MAC address and the Zone Identification Information to the ZIMS (240). And the ZIMS (240) receiving the MAC address and the Zone Identification Information from the ZMS (800) acquires the MIN information matched to the MAC address by searching the MIN information data base by use of the received MAC address. Then, by use of the acquired MIN information, it confirms the Mobile Service Provider the Mobile Terminal is subscribed to, and requests the location registration of the mobile terminal to the HLR (210) by use of the MIN information and the zone identification information. And after searching for the information to be transferred to the corresponding user by use of the MIN information and searching for the information to be provided to the corresponding zone by use of the zone identification information, it transfers the transmission information and the MIN information searched to the corresponding SMS server (220).

INDUSTRIAL APPLICABILITY

As described previously, according to the present invention, by acquiring the MIN information of the Mobile Terminal entering a specified zone, transmitting the information to be provided to the specific zone and the acquired MIN information to the SMS server, and transmitting the information to be provided to the specific zone to the Mobile terminal, the mobile communication user can be provided with the differentiated information. Furthermore, as the HLR can spot the exact location of the mobile terminal in the present and transmit paging message by use of the Base Station where the mobile communication user is located, it is possible to prevent mobile channel from being abused.

The present invention is not limited to the attached drawings and detailed description of the present invention set forth above. Rather, it is apparent to the persons with ordinary knowledge in the relevant field that the present invention may be modified and changed in various manners within the extent not exceeding the essence of the present invention claimed in the following claims.

What is claimed is:

1. A system for providing zone-based personalized information to a user of a mobile communication terminal located in a specific zone among a plurality of zones within a cell serviced by a base station of a cellular network, said system comprising:

a plurality of zone management systems each installed in one of the zones within said cell for acquiring a MIN (Mobile Identification Number) information of the mobile communication terminal entering the respective zone;

a zone information management server that receives the MIN information and zone identification information of the specific zone where the mobile communication terminal is located from the zone management system of said specific zone, requests location registration of the terminal to a home location register (HLR), and retrieves transmission information to be transferred to the terminal according to the MIN information and the zone identification information; and an SMS (Short Message Services) server that receives the transmission information and the MIN information from the zone information management server, gets location information of the terminal corresponding to the MIN information from the HLR, and transfers the transmission information and the MIN information to the base station of the cell where the terminal is located according to the location information;

wherein the zone management systems are connected to the zone information management server via a computer network, without being directly connected to the base station; and the MIN information is arranged to be transmitted from the zone information management server to the HLR via, at least partially, the computer network, without being transmitted by the base station.

2. The system of claim 1, wherein the zone management system wirelessly receives mobile terminal information that is transferred from the mobile terminal to the base station, and acquires the MIN information from the received mobile terminal information.

3. The system of claim 2, wherein the zone management system comprises:
a control part;
an antenna which wirelessly receives high frequency signals including the mobile terminal information that is transmitted from the mobile terminal to the base station;
a high frequency signal-processing part which converts the high frequency signals transmitted from the antenna into intermediate frequency signals;
a base-band processing part which, after converting the intermediate frequency signals received from the high frequency signal-processing part into digital signals, and demodulating the digital signals, acquires the MIN information from the demodulated digital signals; and
a communication part which transmits the MIN information and the zone identification information to the zone information management server under control of the control part.

4. The system of claim 3, wherein the zone management system further comprises
a fire detecting part which detects an outbreak of fire by sensing heat or smoke.

5. The system of claim 3, wherein the high frequency signal processing part comprises:
a diplexer that splits the received signals from the antenna into a high frequency signal of 800 MHz band and a high frequency signal of 1.8 GHz band;
a low noise amplifier that amplifies each high frequency signal inputted from the diplexer;
a band pass filter that selects a needed frequency band from the signals inputted from the low noise amplifier and passes only the selected band;
a Phase Locked Loop (PLL);
a downward frequency mixer that converts the high frequency signals to the intermediate frequency signals by mixing the high frequency signals inputted from the band pass filter and a local signal inputted from the PLL;
an intermediate frequency amplifier that amplifies the intermediate frequency signals inputted from the downward frequency mixer; and
an intermediate frequency signal processing part that controls gain to each intermediate frequency signal outputted from the intermediate frequency amplifier to a desired level.

6. The system of claim 1, wherein the zone management system receives mobile terminal information transmitted from the mobile terminal to the base station, acquires a MAC address of the mobile terminal from the received mobile terminal information, and transmits the MAC address and zone identification information to the zone information management server.

7. The system of claim 6, wherein the zone information management server searches a MIN information database by use of the MAC address that is transmitted from the zone management system, finds the MIN information matched to the MAC address, requests the location registration of the mobile terminal to the HLR, searches the transmission information to be transmitted to the mobile terminal by use of the MAC address and the zone identification information, and transmits the transmission information and the found MIN information to the SMS server.

8. The system of claim 1, wherein each of the zones supervised by the zone management systems, respectively, is 2 to 50 m in radius.

9. A method of providing zone-based personalized information, the method comprising:
installing a plurality of zone management systems each in one of a plurality of zones within a cell serviced by a base station of a cellular network;
acquiring MIN information of a mobile communication terminal entering a specific zone among said zones, said acquiring being performed by the zone management system installed in said specific zone;
requesting location registration of the terminal to a home location register (HLR) by use of the MIN information and zone identification information of the specific zone received from the zone management system, said requesting being performed by a zone information management server;
retrieving, by the zone information management server, transmission information to be transferred to the terminal according to the zone identification information and the MIN information;
transferring the transmission information and the MIN information via an SMS (Short Message Services) server to a SMC (SMS Message Center);
generating, by the SMC, an SMS message by use of the transmission information and getting, also by the SMC, location information of the mobile terminal corresponding to the MIN information from the HLR;
transferring the SMS message and the MIN information to base station of the cell where the terminal is located according to the location information; and
transmitting, by the base station, the SMS message and the MIN information in data burst message format to the terminal;
wherein
said installing comprises connecting the zone management systems to the zone information management server via a computer network, without directly connecting the zone management systems to the base station; and
the MIN information is transmitted from the zone information management server to the HLR via, at least partially, the computer network, without being transmitted by the base station.

10. The method of claim 9, further comprising:
notifying the zone management server of an outbreak of fire when the zone management system detects the outbreak of fire;
transferring a MIN information list of mobile communication terminals, which are located in the zone of the zone management system, and the announcement of the outbreak of fire to the SMC via the SMS server;
generating an SMS message by use of the announcement of the fire in the SMC and getting location information of the mobile terminals corresponding to the MIN information list from the HLR;
transferring the SMS message and the MIN information list to the base station of the cell where the terminals are located via the SMC according to the location information; and
transmitting, by the base station, the SMS message and the MIN information in the list in the data burst message format to the terminals.

11. The method of claim 10, further comprising:
transferring a MIN information list of mobile terminals, which are located in the zone of another zone management system which is located in the same building where the zone management system notifying the fire alarm is also located, and the announcement of the outbreak of fire to the SMS server.

12. The method of claim 9, wherein the step of acquiring the MIN information comprises:
wirelessly receiving mobile terminal information which is transmitted by the mobile terminal entering the specific zone under control of the zone management system; and
acquiring the MIN information from the received terminal information.

13. A method of providing zone-based personalized information, the method comprising:
installing a plurality of zone management systems each in one of a plurality of zones within a cell serviced by a base station of a cellular network;
acquiring MIN information of a mobile communication terminal entering a specific zone among said zones, said acquiring being performed by the zone management system installed in said specific zone;
requesting location registration of the terminal to a home location register (HLR) by use of the MIN information and zone identification information of the specific zone received from the zone management system, said requesting being performed by a zone information management server;
retrieving, by the zone information management server, transmission information to be transferred to the terminal according to the zone identification information and the MIN information;
transferring the transmission information and the MIN information via an SMS (Short Message Services) server to a SMC (SMS Message Center);
generating, by the SMC, an SMS message by use of the transmission information and getting, also by the SMC, location information of the mobile terminal corresponding to the MIN information from the HLR;
transferring the SMS message and the MIN information to base station of the cell where the terminal is located according to the location information; and
transmitting, by the base station, the SMS message and the MIN information in data burst message format to the terminal;
said method further comprising:
acquiring, by the zone management system, MAC information of the mobile terminal entering the zone under supervision of the zone management system;
receiving the MAC information from the zone management system and acquiring the MIN information matched to the MAC information by searching a MIN information database by use of the received MAC information, in the zone information management server;
requesting the location registration of the mobile terminal to the HLR by use of the MIN information and the zone identification information transmitted along with the MAC information from the zone management system;
searching for the information to be transferred to according to the MIN information and the zone identification information, in the zone information management server; and
transferring the transmission information and the MIN information via the SMS server to the SMC.

* * * * *